United States Patent
Sasaki et al.

(10) Patent No.: US 6,751,577 B2
(45) Date of Patent: Jun. 15, 2004

(54) DEGRADATION DIAGNOSTIC METHOD, DEGRADATION DIAGNOSTIC MEDIATION DEVICE AND DEGRADATION DIAGNOSTIC DEVICE AND COMPUTER-READABLE RECORDING MEDIUM ON WHICH A PROGRAM IS RECORDED

(75) Inventors: Keiichi Sasaki, Tokyo (JP); Akira Sawada, Tokyo (JP); Yoko Todo, Tokyo (JP); Katsumi Kanehira, Tokyo (JP); Kazushige Kimura, Kanagawa-ken (JP); Kenji Adachi, Tokyo (JP); Masaaki Ookubo, Tokyo (JP); Tadayoshi Murayama, Chiba-ken (JP); Hiromi Imai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 74 days.

(21) Appl. No.: 10/032,070

(22) Filed: Dec. 31, 2001

(65) Prior Publication Data

US 2002/0120426 A1 Aug. 29, 2002

(30) Foreign Application Priority Data

Jan. 10, 2001 (JP) .................................... P2001-002848

(51) Int. Cl.[7] ............................................. G01R 31/28
(52) U.S. Cl. ..................... 702/183; 702/180; 702/182; 702/184; 702/185; 702/186; 702/187; 702/188
(58) Field of Search ................. 702/180, 182–188, 702/FOR 134–137, FOR 159, FOR 162, FOR 163, FOR 170, FOR 171; 714/25, 27, 31, 33, 45–51; 700/177

(56) References Cited

U.S. PATENT DOCUMENTS

RE33,368 E  * 10/1990  Darling et al. ................. 375/8
6,073,089 A      6/2000  Baker et al.

FOREIGN PATENT DOCUMENTS

JP          6-331507        12/1994

* cited by examiner

Primary Examiner—Marc S. Hoff
Assistant Examiner—Carol S. W. Tsai
(74) Attorney, Agent, or Firm—Oblon, Spivak, McClelland, Maier & Neustadt, P.C.

(57) ABSTRACT

In a method of degradation diagnosis according to the present invention, an equipment degradation diagnosis request is input through network 4 from a diagnosis requester and a degradation diagnosis requests handler is selected in accordance with execution condition information of degradation diagnosis specified in respect of at least one degradation diagnosis requests handler and condition information in accordance with which an diagnosis requester requests degradation diagnosis. A request for execution of degradation diagnosis is made to this selected degradation diagnosis requests handler and the results of execution of the degradation diagnosis obtained by the selected degradation diagnosis requests handler are acquired and output through network 4 to the diagnosis requester. In this way, a service can be implemented whereby diagnosis of degradation requested by a diagnosis requester from a diagnostic service provider is performed rapidly and easily at low cost.

27 Claims, 31 Drawing Sheets

|  | DESIRED DIAGNOSIS FEE | EQUIPMENT DESIRED TO BE DIAGNOSED | PRECISION OF DIAGNOSIS | AIR TEMPERATURE | HUMIDITY | CONCENTRATION OF CHLORINE GAS | ... |
|---|---|---|---|---|---|---|---|
| USER a1 | 300,000 yen | CONTROL PANEL | DEGRADATION DIAGNOSIS | 30 | 80 | 0.03 ppm | ... |
| USER a2 | 500,000 yen | CIRCUIT BOARD | DEGRADATION DIAGNOSIS | 20 | 60 | 0.08 ppm | ... |
| USER a3 | 1,000,000 yen | LOGIC IC | LIFE DIAGNOSIS | 20 | 60 | 0.07 ppm | ... |
| USER a4 | 200,000 yen | RELAY BOARD | DEGRADATION DIAGNOSIS | 15 | NOT KNOWN | NOT KNOWN | ... |
| ... | ... | ... | ... | ... | ... | ... | ... |

| | DIAGNOSTIC FEE | EQUIPMENT TO BE DIAGNOSED | PRECISION OF DIAGNOSIS | ENVIRONMENTAL DATA REQUIRED | EQUIPMENT INFORMATION REQUIRED | |
|---|---|---|---|---|---|---|
| DIAGNOSTIC SERVICE PROVIDER b1 | 500,000 yen | CONTROL DEVICE | LIFE DIAGNOSIS | AIR TEMPERATURE, CONCENTRATION OF CHLORINE... | DATE OF INSTALLATION... | ... |
| DIAGNOSTIC SERVICE PROVIDER b2 | 3,000,000 yen | EWS | DEGRADATION DIAGNOSIS | AIR TEMPERATURE, AMOUNT OF DUST... | ... | ... |
| DIAGNOSTIC SERVICE PROVIDER b3 | 1,000,000 yen | ORDINARY IC | LIFE DIAGNOSIS | HUMIDITY... | DATE OF MANUFACTURE OF THE IC, TYPE OF SEALING FILM | ... |
| DIAGNOSTIC SERVICE PROVIDER b4 | 100,000 yen | CIRCUIT BOARD | DEGRADATION DIAGNOSIS | HUMIDITY, CHLORINE CONCENTRATION... | WIDTH OF WIRING, TYPE OF RESIST | ... |
| ... | ... | ... | ... | ... | ... | ... |

| | EXAMINATION FEE | ENVIRONMENTAL DATA CAPABLE OF BEING EXAMINED | |
|---|---|---|---|
| ENVIRONMENTAL MEASURER c1 | 50,000 yen | AIR TEMPERATURE, HUMIDITY | |
| ENVIRONMENTAL MEASURER c2 | 300,000 yen | AMOUNT OF DUST | |
| ENVIRONMENTAL MEASURER c3 | 100,000 yen | CONCENTRATION OF VARIOUS GASES; ONE TYPE | |
| ENVIRONMENTAL MEASURER c4 | 100,000 yEN | AIR TEMPERATURE, HUMIDITY, AMOUNT OF WIND | |
| ... | ... | ... | ... |

*FIG. 4*

|  | TYPE OF EQUIPMENT | VARIOUS RATINGS | |
|---|---|---|---|
| EQUIPMENT SUPPLIER d1 | LOGIC IC | COPPER WIRING, WIRING WIDTH 15 micron... | ... |
| EQUIPMENT SUPPLIER d2 | CIRCUIT BOARD | COPPER PATTERN, WIRING WIDTH 0.25mm, WIRING SEPARATION 0.5mm... | ... |
| EQUIPMENT SUPPLIER d3 | MY TYPE RELAY | METAL JOINT, CONTACT RESISTANCE 0.1mΩ, COIL: ENAMEL COATING... | ... |
| EQUIPMENT SUPPLIER d4 | CIRCUIT BOARD (BEFORE '94) | COPPER PATTERN, WIRING WIDTH 2mm, WIRING SEPARATION 2mm, NO RESIST FILM | ... |
| ... | ... | ... | ... |

FIG. 5

| | ENVIRONMENTAL DATA REQUIRED FOR DIAGNOSIS | | | | | DIAGNOSIS FEE |
|---|---|---|---|---|---|---|
| | A | B | C | D | E | |
| DIAGNOSTIC SERVICE PROVIDER b1 | ○ | ○ | | | | Fa |
| DIAGNOSTIC SERVICE PROVIDER b2 | ○ | ○ | ○ | | | Fb |
| DIAGNOSTIC SERVICE PROVIDER b3 | ○ | | ○ | ○ | | Fc |
| DIAGNOSTIC SERVICE PROVIDER b4 | ○ | | ○ | ○ | ○ | Fd |

*FIG. 6*

| | ENVIRONMENTAL DATA CAPABLE OF EXAMINATION | | | | | MEASUREMENT FEE |
|---|---|---|---|---|---|---|
| | A | B | C | D | E | |
| ENVIRONMENTAL MEASURER c1 | ○ | ○ | | | ○ | F1 |
| ENVIRONMENTAL MEASURER c2 | | | ○ | ○ | ○ | F2 |
| ENVIRONMENTAL MEASURER c3 | ○ | | ○ | | ○ | F3 |
| ENVIRONMENTAL MEASURER c4 | | | ○ | | ○ | F4 |
| ENVIRONMENTAL MEASURER c5 | | ○ | | | ○ | F5 |

FIG. 7

| | DEFICIENT ENVIRON-MENTAL DATA | ENVIRONMENTAL MEASURERS CAPABLE OF EXAMINING THE DEFICIENT ENVIRONMENTAL DATA |
|---|---|---|
| DIAGNOSTIC SERVICE PROVIDER b1 | B | c1, c5 |
| DIAGNOSTIC SERVICE PROVIDER b2 | B | c1, c5 |
| DIAGNOSTIC SERVICE PROVIDER b3 | D | c2 |
| DIAGNOSTIC SERVICE PROVIDER b4 | D, E | c2 |

FIG. 8

DESIRED FEE: M

| | DIAGNOSTIC SERVICE PROVIDER | ENVIRONMENTAL MEASURER | DIAGNOSIS FEE |
|---|---|---|---|
| CANDIDATE 1 | b4 | c2 | Fd + F2 + m |
| CANDIDATE 2 | b3 | c2 | Fc + F2 + m |
| CANDIDATE 3 | b2 | c5 | Fb + F5 + m |
| CANDIDATE 4 | b2 | c1 | Fb + F1 + m |
| CANDIDATE 5 | b1 | c5 | Fa + F5 + m |
| CANDIDATE 6 | b1 | c1 | OVER BUDGET |

*FIG. 9*

ENVIRONMENTAL RANGE TABLE 45
FIG. 13

| ENVIRONMENTAL FACTORS | | | RANGES | | | |
|---|---|---|---|---|---|---|
| | | | I | II | III | IV |
| TEMPERATURE (°C) | ANNUAL AVERAGE | A | 20 OR LESS | 20 < AND ≤ 50 | 25 < AND ≤ 30 | MORE THAN 30 |
| RELATIVE HUMIDITY (%) | RAINY SEASON AVERAGE | B | 60 OR LESS | 60 < AND ≤ 70 | 70 < AND ≤ 85 | MORE THAN 85 |
| | ANNUAL AVERAGE | | 50 OR LESS | 50 < AND ≤ 60 | 60 < AND ≤ 75 | MORE THAN 75 |
| GAS (ppm) | SULPHUR DIOXIDE ($SO_2$) | $C_1$ | 0.04 OR LESS | 0.04 < AND ≤ 0.08 | 0.08 < AND ≤ 0.2 | 0.2 < AND ≤ 5 |
| | NITROGEN DIOXIDE ($NO_2$) | $C_2$ | 0.02 OR LESS | 0.02 < AND ≤ 0.05 | 0.05 < AND ≤ 0.1 | 0.1 < AND ≤ 5 |
| | HYDROGEN SULPHIDE ($H_2S$) | $C_3$ | 0.003 OR LESS | 0.003 < AND ≤ 0.01 | 0.01 < AND ≤ 0.1 | 0.1 < AND ≤ 10 |
| | CHLORINE GAS ($Cl_2$) | $C_4$ | 0.002 OR LESS | 0.002 < AND ≤ 0.01 | 0.01 < AND ≤ 0.1 | 0.1 < AND ≤ 1 |
| | AMMONIA GAS ($NH_3$) | $C_5$ | 0.1 OR LESS | 0.1 < AND ≤ 1 | 1 < AND ≤ 10 | 10 < AND ≤ 100 |
| EQUIVALENT SALT DEPOSITION RATE (mg/cm²/year) | | D | 0.03 OR LESS | 0.03 < AND ≤ 0.06 | 0.06 < AND ≤ 0.12 | MORE THAN 0.12 |
| DEGREE OF SOILING | DISTANCE FROM COAST (km) | | MORE THAN 2 | 1 < AND ≤ 2 | 0.5 < AND ≤ 1 | LESS THAN 0.5 |

ENVIRONMENTAL FACTOR WEIGHTING TABLE 46

| ENVIRONMENTAL FACTOR | RANGE | | | |
|---|---|---|---|---|
| | I | II | III | IV |
| A | 1 | 2 | 4 | 8 |
| B | 1 | 8 | 16 | 24 |
| C1 | 1 | 3 | 6 | 9 |
| C2 | 1 | 3 | 6 | 9 |
| C3 | 1 | 8 | 14 | 20 |
| C4 | 1 | 10 | 20 | 30 |
| C5 | 1 | 2 | 4 | 8 |
| D | 1 | 8 | 15 | 24 |

*FIG. 14*

ENVIRONMENTAL EVALUATION POINTS ZONE TABLE 47

| ENVIRONMENTAL RANGES / ENVIRONMENTAL FACTORS | | I MEASURED VALUES | I EVALUATION POINTS | II MEASURED VALUES | II EVALUATION POINTS | III MEASURED VALUES | III EVALUATION POINTS | IV MEASURED VALUES | IV EVALUATION POINTS | V MEASURED VALUES | V EVALUATION POINTS |
|---|---|---|---|---|---|---|---|---|---|---|---|
| TEMPERATURE (°C) | A | ≤ 20 | 1 | ≤ 25 | 2 | ≤ 30 | 4 | ≤ 35 | 8 | > 35 | 12 |
| RELATIVE HUMIDITY (%RH) | B | ≤ 60 | 1 | ≤ 65 | 6 | ≤ 70 | 12 | ≤ 80 | 24 | > 80 | 36 |
| CORROSIVE GAS (mdd) | CO2 C1 | ≤ 0.02 | 1 | ≤ 0.05 | 4 | ≤ 0.2 | 8 | ≤ 0.5 | 16 | > 0.5 | 24 |
| | SO3 H2S C2 | ≤ 0.02 | 1 | ≤ 0.05 | 6 | ≤ 0.2 | 12 | ≤ 0.5 | 24 | > 0.5 | 36 |
| | NO2 C3 | ≤ 0.02 | 1 | ≤ 0.05 | 3 | ≤ 0.2 | 6 | ≤ 0.5 | 12 | > 0.5 | 18 |
| | Cl C4 | ≤ 0.02 | 1 | ≤ 0.05 | 7 | ≤ 0.2 | 14 | ≤ 0.5 | 28 | > 0.5 | 42 |
| | NH3 C5 | ≤ 0.02 | 1 | ≤ 0.1 | 3 | ≤ 1.0 | 6 | ≤ 10 | 12 | > 10 | 18 |
| SEA SALT PARTICLES (mdd) | D | ≤ 0.01 | 1 | ≤ 0.03 | 5 | ≤ 0.1 | 10 | ≤ 0.3 | 20 | > 0.3 | 30 |
| DISTANCE FROM COAST (km) | | < 2.0 | | ≤ 1.5 | | ≤ 1.0 | | ≤ 0.5 | | < 0.5 | |

FIG. 17

DEGRADATION DIAGNOSTIC METHOD, DEGRADATION DIAGNOSTIC MEDIATION DEVICE AND DEGRADATION DIAGNOSTIC DEVICE AND COMPUTER-READABLE RECORDING MEDIUM ON WHICH A PROGRAM IS RECORDED

CROSS-REFERENCE TO RELATED APPLICATION

This application claims benefit of priority to Japanese Application No. JP 2001-2848 filed Jan. 10, 2001, the entire content of which is incorporated by reference herein.

BACKGROUND OF THE INVENTION

1. Field of the Invention

The present invention relates to a degradation diagnostic method that executes degradation diagnosis (for example, life diagnosis etc.) of various types of equipment (including, for example, installations such as plants, or electrical or electronic equipment etc.), a degradation diagnostic mediation device and degradation diagnostic device and computer-readable recording medium on which a program is recorded.

2. Description of the Related Art

For example, when examining the degradation condition (for example, remaining life etc.) for determining whether or not updating or maintenance is necessary as a result of a given item of equipment becoming worn out, degradation diagnosis is executed by examining the environment in which the item of equipment is arranged and/or by examining the current degree of degradation of the equipment. Also, in order to infer the degradation condition of equipment, it is necessary to have a grasp of what degree of equipment degradation means that it will no longer be able to provide satisfactory function (has reached the end of its life).

Specifically, when executing degradation diagnosis of equipment, the state of degradation of the equipment must be inferred from the results of an examination of the environment obtained by environmental examination, and information regarding the relationship of the degree of degradation of the equipment possessed by the manufacturer who created the equipment and the state of degradation.

Typically, when executing degradation diagnosis of various types of equipment, the diagnosis requester (who may be the owner of the equipment to be diagnosed) requests a diagnostic service provider that has the detailed diagnostic know-how for the equipment to be diagnosed to carry out the task of diagnosis.

The diagnostic service provider from whom the diagnosis has been requested sends a technician who will execute the diagnosis to the site. This technician takes some time to measure and observe the necessary items for diagnosis. The diagnostic service provider then collects and analyses the necessary data using its own equipment and/or techniques and provides the results to the diagnosis requester.

The diagnosis requester makes payment from time to time for the diagnostic work and/or report. Alternatively, the diagnostic charges may be pre-paid as a service charge which is added in beforehand when the equipment is supplied.

As described above, when equipment degradation diagnosis is executed, environmental examination to obtain a precise grasp of the environment in which the equipment is installed, a diagnostic method of quantitatively evaluating the stress to which the equipment is subjected from the environment, and equipment information indicating what degree of stress results in equipment malfunction are necessary.

However, examination of the environment in which the equipment is arranged, diagnosis of equipment degradation, and ascertaining equipment information are difficult. It is therefore difficult for the diagnosis requester to execute degradation diagnosis of equipment himself.

The diagnosis requester therefore has no alternative to requesting degradation diagnosis from a diagnostic service provider, so the costs of equipment degradation diagnosis are raised.

Also, in order to execute diagnosis the diagnostic service provider must ensure that a technician is always available to the diagnostic service provider.

However, when circumstances occur such as that requests overlap in this same period, it is difficult to ensure supply of a technician, so it is not necessarily possible to guarantee that diagnosis will be executed at the time point requested by the diagnosis requester.

Also, if arrangements are made to guarantee more than the required number of technicians, this imposes a load on the diagnostic service provider in that human resources costs become high.

Also, conventionally, even if exactly the same diagnostic case is experienced, the diagnosis results obtained by each diagnosis requester are the property of the respective diagnosis requesters, so there is no possibility of sharing the diagnosis results between the different diagnosis requesters.

Consequently, even if a plurality of diagnosis requesters wish identical diagnoses to be carried out, the respective diagnosis requesters request identical diagnoses from the diagnosis service provider so that identical diagnoses are repeated in respect of the diagnosis service requesters. Consequently, diagnosis costs and diagnosis labor are inefficient both for the diagnosis requesters and the diagnosis service provider.

Typically, diagnosis service providers have considered avoiding repetition of identical diagnoses by encapsulating diagnostic results for each diagnosis requester. However, for reasons of the duty of secrecy in regard to the data of a diagnosis requester and the fact that even duplicated work can still be charged to diagnosis fees, there is the problem that little progress has been made in regard to amelioration of work duplication.

Furthermore, a method in which, rather than dispatching a technician to measure the environmental data to the site, the diagnostic service provider executes degradation diagnosis by sending to the diagnosis requester an environment evaluation unit whereby the diagnosis requester can measure the environmental data is disclosed in Japanese Patent Application No. 2000-255957.

However, even with the invention of this Japanese Patent Application No. 2000-255957, it is difficult to make degradation diagnosis efficient, since degradation diagnosis is executed for respective diagnostic requests even if the diagnostic case is the same.

SUMMARY OF THE INVENTION

Accordingly, one object of the present invention is to provide a novel degradation diagnostic method, degradation diagnostic mediation device and degradation diagnostic device and computer-readable recording medium on which a program is recorded whereby the diagnostic know-how of the diagnostic service provider can be published on the Internet and degradation diagnosis executed efficiently for both the diagnosis requester and diagnosis service provider.

The above object is achieved by a degradation diagnostic method, degradation diagnostic mediation device and degradation diagnostic device and computer-readable recording medium on which a program is recorded constituted as follows.

Specifically, according to the degradation diagnostic method of the present invention, an equipment degradation diagnostic request is input from a diagnosis requester through the network, a degradation diagnosis requests handler is selected in accordance with degradation diagnosis execution condition information determined for at least one degradation diagnostic request handler and condition information in accordance with which the diagnostic requester requests degradation diagnosis, execution of degradation diagnosis is requested of this selected degradation diagnosis request handler, the execution results of the degradation diagnosis obtained by the selected degradation diagnosis request handler are acquired, and are output through the network to the diagnosis requester.

It should be noted that the degradation diagnostic mediator and the diagnostic service provider constituting the degradation diagnosis request handler which execute the degradation diagnostic method of the present invention could be the same or different. The degradation diagnostic mediator collects mediation fees from the diagnosis requester or the diagnostic service provider. Also, the diagnostic service provider may collect diagnostic fees from the diagnosis requester.

The execution condition information of degradation diagnosis specified in respect of the degradation diagnostic request handler includes for example the amount of diagnostic fees, the method/type of degradation diagnosis and the type of information utilized in the degradation diagnosis.

The condition information in accordance with which the diagnosis requester requests degradation diagnosis includes, for example, the amount of diagnostic fees payable, the method/type of degradation diagnosis required by the diagnosis requester, and the type of information which the diagnosis requester can provide for degradation diagnosis.

According to the present invention, mediation can be effected between the diagnosis requester and diagnostic service provider, so degradation diagnosis is requested and degradation diagnosis is executed when their mutual conditions are satisfied.

Consequently, a diagnosis requester can obtain execution results of degradation diagnosis which the requester desires with the fee which the requester desires. Also, a diagnostic service provider can accept from a wide range of sources only degradation diagnostic requests matching its own conditions and can perform degradation diagnosis accordingly.

According to the present invention, when, for example, the environmental information utilized in the degradation diagnosis by the selected degradation diagnosis request handler is deficient, measurement can be requested by selecting a measurement requests handler of such deficient environmental information, so that the measurement results of the deficient environmental information can be provided to the selected degradation diagnosis requests handler.

It should be noted that the measurer of environmental information constituting the environmental information measurement requests handler could be the same as or different from the degradation diagnosis mediator or diagnostic service provider. The environmental information measurer may collect environmental information measurement fees from the degradation diagnosis mediator, diagnosis requester, or diagnostic service provider etc.

Also, according to the present invention, for example, an equipment maintenance request may be input through the network from a diagnosis requester who has obtained the execution results and maintenance may thereby be requested by selecting a maintenance request handler.

An equipment supplier constituting a maintenance request handler may be the same as or different from a degradation diagnosis mediator, environmental information measurer, or diagnostic service provider etc.

Also, according to the present invention, for example the content of a degradation diagnostic request and the results of execution of degradation diagnosis by a degradation diagnostic request handler may be registered in a diagnostic results database and, if a separate i.e. another degradation diagnostic request having a prescribed relationship degradation diagnostic request input from the diagnosis requester is registered in the diagnostic results database, the execution results of the degradation diagnosis based on the degradation diagnosis request having this prescribed relationship may be read from the diagnostic results database and output to the diagnosis requester through the network.

Also, in this case, the diagnosis requester and/or degradation diagnosis mediator that registered its degradation diagnosis execution results in the diagnostic results database may collect a diagnostic results utilization fee from another requester that accessed the diagnostic results database.

As the prescribed relationship, for example, the degradation diagnostic requests may be identical or similar.

In this way, degradation diagnosis execution results may be shared by a plurality of diagnosis requesters, so degradation diagnosis results may be provided to diagnosis requesters in an efficient manner and the business of the diagnostic service provider can be made more efficient.

If the present invention is applied in a modified fashion, information for diagnostic purposes specifying degradation diagnostic processing whereby the state of degradation of equipment can be diagnosed is stored in a diagnostic database, information utilized for degradation diagnostic processing is input from a diagnostic requester through the network, and degradation diagnostic processing executed in accordance with the information for diagnostic purposes stored in the diagnostic database and information input from the diagnosis requester, and these execution results can be output to the diagnosis requester through the network.

The performer of this degradation diagnostic method may collect performance fees of degradation diagnosis from the diagnosis requester. Also, a diagnostic service provider whose information for diagnostic purposes is stored in the diagnostic database may collect fees for the provision of its know-how from the performer of this degradation diagnostic method or diagnosis requester.

The method of degradation diagnosis of the present invention as described above could be utilized in the operation of a degradation diagnosis mediating device or the modified degradation diagnostic method of the present invention could be utilized in the operation of a degradation diagnostic device.

Furthermore, the degradation diagnostic method of the present invention and the modified degradation diagnostic method of the present invention could be utilized by recording a program for execution thereof by a computer on a recording medium.

By employing a recording medium on which such a program is recorded, functions for executing the method described above can be added in a simple fashion to servers, computers, or computational systems that do not have functions for executing the methods described above.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a view illustrating by way of example the storage content of a user information database;

FIG. 3 is a view illustrating by way of example the storage content of a diagnostic client information database;

FIG. 4 is a view illustrating by way of example the storage content of an environmental measurement client information database;

FIG. 5 is a view illustrating by way of example the storage content of an equipment supply client information database;

FIG. 6 is a view showing diagrammatically part of the diagnostic service provider information registered in the diagnostic client information database;

FIG. 7 is a view showing diagrammatically part of the environmental measurer information recorded in the environmental measurement client information database;

FIG. 8 is a view showing diagrammatically environmental data that is insufficient for diagnosis by diagnostic service providers;

FIG. 9 is a view illustrating diagrammatically combinations of diagnostic service provider and environmental measurer capable of executing diagnosis and their diagnosis charges;

FIG. 13 is a view illustrating by way of example a table of environmental ranges;

FIG. 14 is a view illustrating by way of example a table of weighting factors of environmental factors;

FIG. 17 is a view illustrating by way of example an environmental evaluation points range table;

DETAILED DESCRIPTION OF THE PREFERRED EMBODIMENTS

Figure 1A:
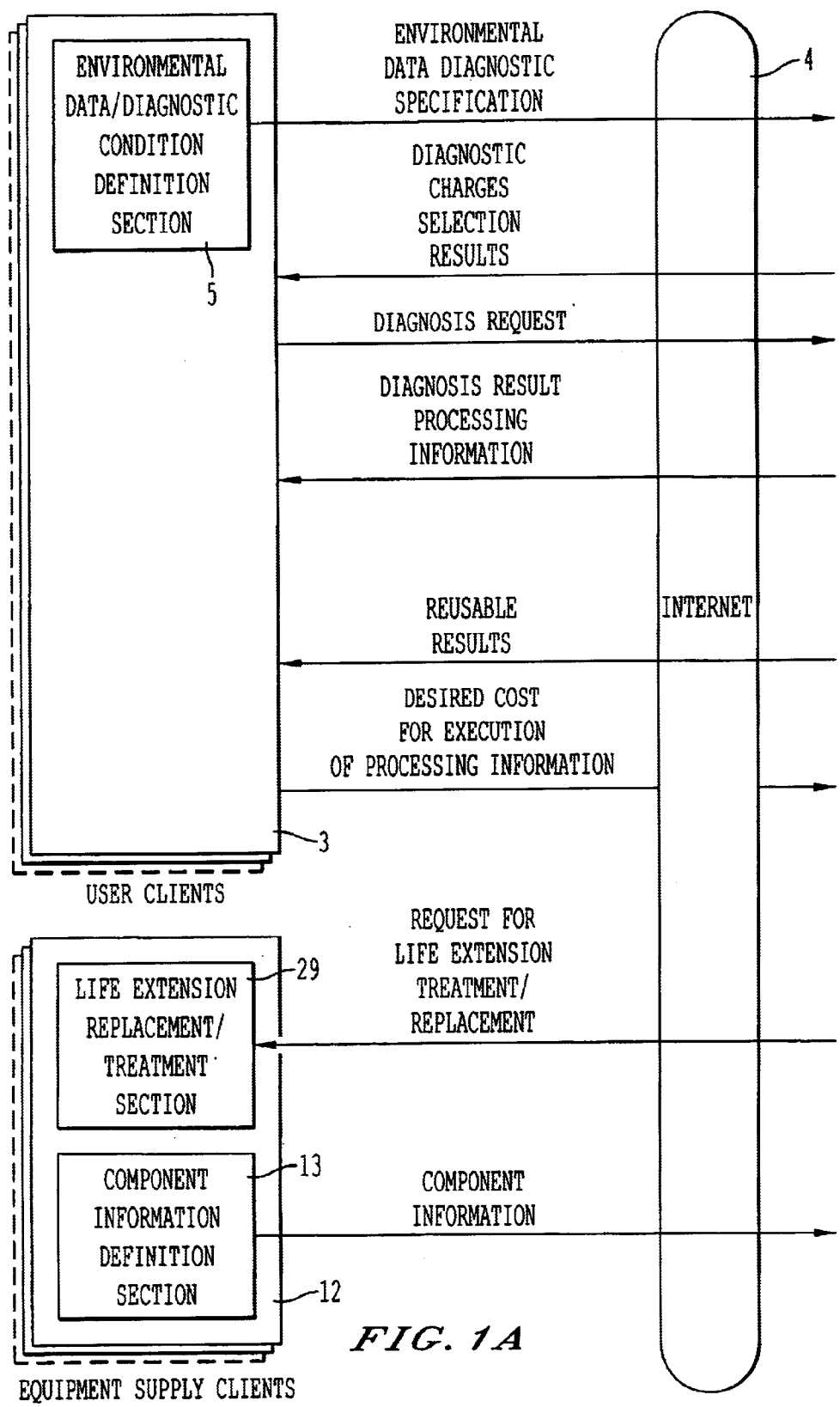
FIG. 1 is a view illustrating by way of example a diagrammatic layout of a degradation diagnosis system in which a method of degradation diagnosis according to a first embodiment of the present invention is implemented.

Referring now to the drawings, wherein like reference numerals designate identical or corresponding parts throughout the several views, and more particularly to FIG. 1 thereof, one embodiment of the present invention will be described.

First Embodiment

In this embodiment, a degradation diagnostic method that mediates between a diagnosis request and diagnostic result between a diagnosis requester and diagnostic service provider is described.

Figure 1B:
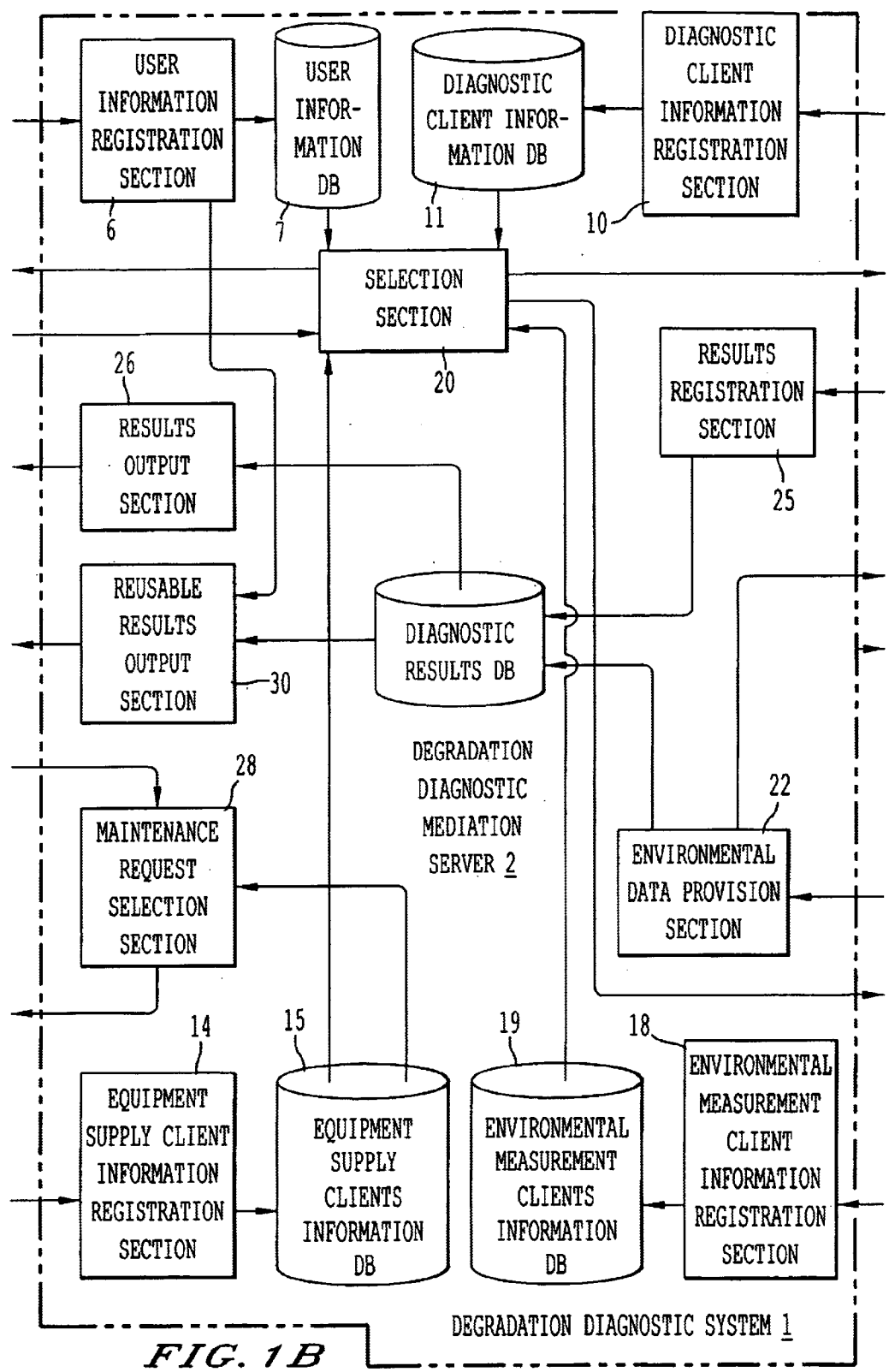
Figure 1C:
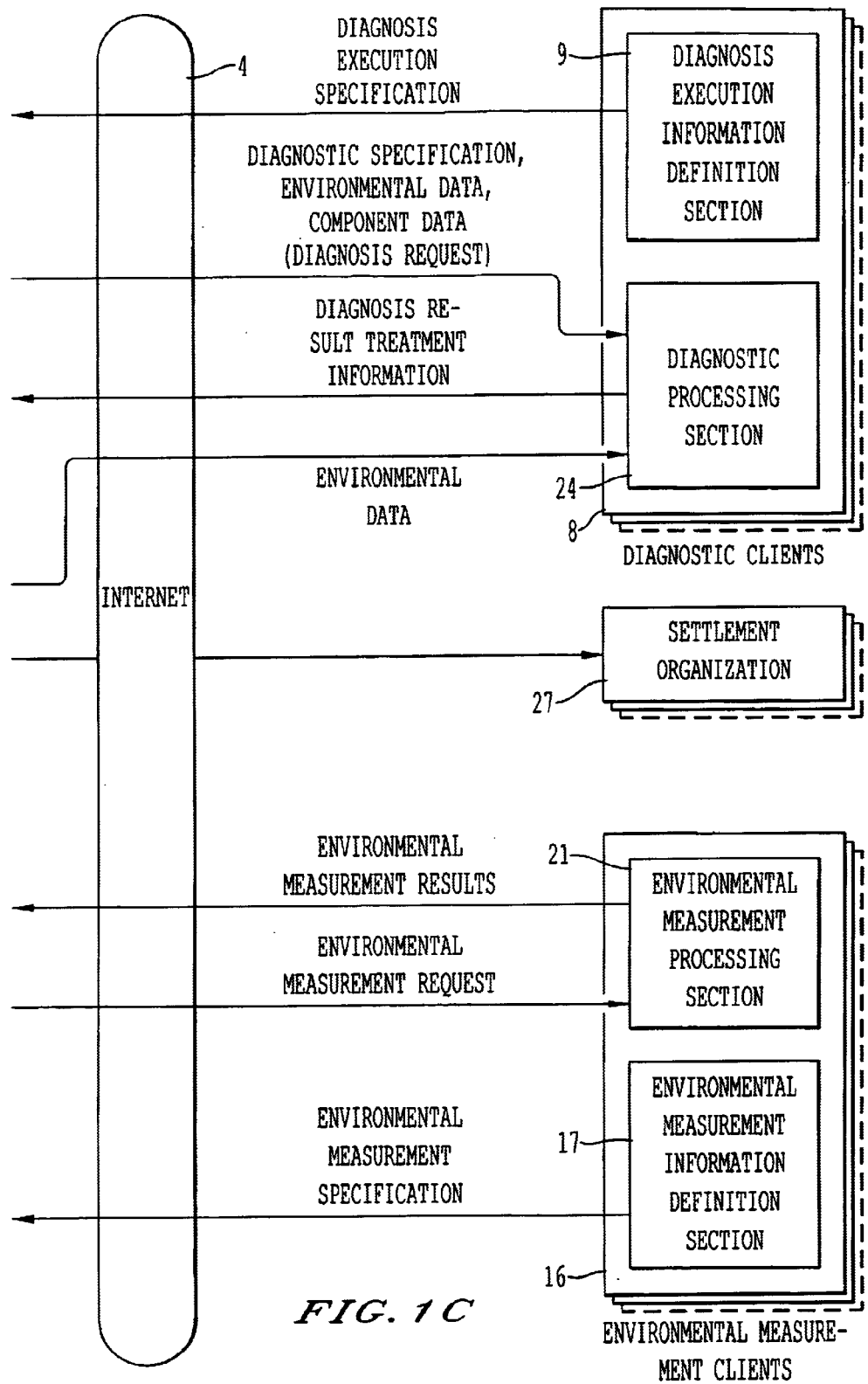

FIG. 1 is a block diagram illustrating by way of example the layout of a degradation diagnostic system for implementing a degradation diagnostic method according to this embodiment.

A degradation diagnosis mediation server 2 in this degradation diagnostic system 1 is connected through a communications circuit such as Internet 4 with a plurality of user clients 3 operated by users.

In environmental data diagnostic conditions definitions section 5 of user client 3, there are defined data (temperature, humidity, concentration of corrosive gas, amount of dust, and amount of sea salt particles etc.) relating to the environment in which the equipment (component) to be diagnosed is arranged and the diagnostic specification constituting the condition information specified when the diagnosis was requested (name of equipment to be diagnosed (component name), specification of equipment to be diagnosed (component), size of the equipment to be diagnosed, desired precision of diagnosis, requested level of diagnostic fees, and diagnostic period etc.).

User client 3 sends the environmental data and diagnostic specification to degradation diagnosis mediation server 2.

User information registration section 6 of degradation diagnosis mediation server 2 receives the environmental data and diagnostic specification, and registers these in user information database 7.

Also, degradation diagnostic mediation server 2 is connected with a plurality of diagnostic clients 8 operated by the diagnostic service provider that executes the equipment diagnosis through a communication circuit such as Internet 4.

In diagnosis execution information definition section 9 of diagnostic client 8, there are defined as the diagnosis execution specification data conditions for executing diagnosis such as the type of environmental data needed for executing diagnosis (temperature, humidity, concentration of corrosive gas, amount of dust, and amount of sea salt particles etc.), information of the equipment to be diagnosed needed to execute diagnosis (name of equipment to be diagnosed, specification of equipment to be diagnosed etc.) and charges for executing diagnosis.

Diagnostic client 8 sends the diagnosis execution specification to the degradation diagnosis mediation server 2.

Diagnostic client information registering section 10 of degradation diagnosis mediation server 2 registers the diagnosis execution specification received from diagnosis execution information definition section 9 in diagnostic client information database 11.

Also, degradation diagnostic mediation server 2 is connected with an equipment supplier client 12 operated by the equipment supplier that supplies information regarding the components used in the equipment through a communication circuit such as Internet 4.

In component information definition section 13 of equipment supply client 12, there is defined the information of components employed in the equipment (component name, rating, materials used, construction, and position of arrangement of the component).

Equipment supply client 12 sends the component information to degradation diagnostic mediation server 2.

Equipment supply client information registration section 14 of degradation diagnosis mediation server 2 registers the information received from equipment supply client 12 in equipment supply client information database 15.

Also, degradation diagnosis mediation server 2 is connected with a plurality of environmental measurement clients 16 operated by the environmental measurer that examines the atmospheric environment through a communications circuit such as Internet 4.

In environmental measurement information definition section 17 of environment measurement client 16, there is defined an environmental measurement specification comprising the environmental factors (temperature, humidity, atmospheric pressure, concentration of various types of gas, degree of soiling, amount of sea salt particles and amount of dust, etc.) and the charges for examining these.

Environmental measurement client 16 sends the environmental measurement specification to degradation diagnostic mediating client 2.

Environmental measurement client information registration section 18 of degradation diagnostic mediation server 2 registers the environmental measurement specification received from environmental measurement client 16 in environmental measurement client information database 19.

Selection section 20 of degradation diagnostic mediation server 2 selects a diagnostic client that can execute the diagnosis desired by the user by referring to the user information registered in user information database 7 and the information registered in diagnostic client information database 11. For example, a diagnostic service provider that executes the diagnosis with the charge desired by the user, or a diagnostic service provider that executes the diagnostic method desired by the user is selected.

Also, selection section 20 ascertains the environmental data required for executing the diagnosis by the diagnostic service provider selected and the environmental data registered by the user in the user information database 7 and, if there is insufficient environmental data, selects an environmental measurer capable of making an inspection concerning the deficient environmental data in accordance with registered contents of environmental measurement client information database 19. However, if the environmental data registered in the user information database 7 is sufficient, selection of an environmental measurer is dispensed with.

Also, selection section 20 ascertains the information of the equipment to be diagnosed that is necessary for execution of diagnosis by the selected diagnostic service provider and the information of the equipment to be diagnosed that is registered by the user in user information database 7 and, if there is insufficient information concerning the equipment that is to be diagnosed, selects an equipment supplier capable of supplying the deficient information concerning the equipment that is to be diagnosed in accordance with the registered content of equipment supplier client information database 15 and reads the deficient information of the equipment that is to be diagnosed. However, if the information concerning the equipment that is to be diagnosed that is registered in the user information database 7 is sufficient, selection of an equipment supplier is dispensed with.

Selection section 20 sends to user client 3 that is operated by the user information such as the name of the diagnostic service provider fulfilling the user diagnostic request, the name of the environmental measurer, the name of the equipment supply client, the necessary charges for diagnosis, and the charges for environmental measurement etc. The diagnostic service providers that are suited for the diagnosis, environmental measurers, equipment suppliers and required fees for diagnosis are thereby communicated to the user.

The user selects a desired combination of one or a plurality of diagnostic service providers, environmental measurers and equipment suppliers from these combinations that have been introduced/proposed, and a diagnosis request is thereby sent from user client 3 to selection section 20.

Using the information received from user client 3, selection section 20 makes a diagnosis request to diagnosis client 8 operated by the diagnostic service provider contained in the selected combination and makes a request for execution of environmental measurement to environmental measurement client 16 that is operated by the environmental measurer contained in the selected combination.

However, if request mediation authority is given to the degradation diagnostic mediation server 2 by the user, the diagnostic service provider and environmental measures are automatically selected by selection section 20 not exceeding the desired value of diagnostic fees registered by user client 3, and execution of diagnosis and environmental measurement are requested.

The environmental measurer conducts an examination of the environmental data whose examination has been requested using environmental measurement processing section 21, measures the values of environmental factors defined by environmental measurement information definition section 17, and sends these to environmental data provision section 22 of degradation diagnosis mediation server 2.

Environmental data provision section 22 registers the environmental data received from environmental measurement client 16 in the diagnosis results database 23 and sends these to the diagnostic client 8 operated by the selected diagnostic service provider.

Also, selection section 20, referring to the user information database 7 and equipment supply client information database 15, sends the diagnostic specification required for diagnosis, environmental data and equipment information to the diagnostic client 8 operated by the selected diagnostic service provider.

However, if the information of the equipment to be diagnosed registered in user information database 7 is sufficient, the information of equipment supplier client information database 15 is not utilized.

Diagnostic client 8 executes degradation diagnostic processing by means of diagnostic processing section 24, using the data received from degradation diagnostic mediation server 2.

Diagnostic client 8 then sends the diagnosis results and the treatment information (prescription data) of the equipment to be diagnosed corresponding to these diagnostic results to results registration section 25 of degradation diagnosis mediation server 2.

Results registration section 25 of degradation diagnostic mediation server 2 registers the received diagnostic results and treatment information together with the data employed for diagnosis in diagnostic results database 23 of degradation diagnosis mediation server 2.

The data employed for diagnosis comprises the information employed in degradation diagnostic processing of diagnostic client 8 such as for example environmental data received from user client 3, diagnosis charges made by diagnostic client 8, diagnostic period, diagnostic client name, environmental data received from environmental measurement clients 16 and measurement charges therefor, period of examination, environmental measurement client name, information concerning the equipment to be diagnosed received from user client 3, and information of equipment to be diagnosed received from equipment supplier client 12 etc.

Also, the data stored/held in diagnostic results database 23 is transmitted to user client 3 operated by the user that requested the diagnosis, by means of results output section 26.

The user pays the diagnostic charges, environmental measurement charges and mediation charges respectively to the diagnostic service provider, environmental measurer, and degradation diagnostic agent that executed the diagnosis. Payment is executed by means of a settlement organization 27 connected through Internet 4.

Diagnostic client 8 presents to user client 3 the diagnostic results and treatment information for the equipment to be diagnosed in regard to these diagnostic results, but, if the treatment information contains a reference introducing equipment to be updated or a reference introducing equipment required for prolongation of life, this introduction will make preferential reference to the products of the equipment supplier that provided the information.

If the user wishes to execute equipment updating or life prolonging treatment in response to the treatment information that has thus been provided, the user requests maintenance by transmitting the treatment information and desired cost of execution to maintenance request selection section 28 of degradation diagnostic agent server 2.

Referring to the equipment supplier client information database 15, maintenance request selection section 28 selects an equipment supplier matching the conditions, from the registered equipment suppliers, and makes a request to life prolongation replacement treatment section 29 of equipment supplier client 12 operated by the selected equipment supplier to execute the task of fulfilling the prescription based on the treatment information.

It should be noted that some equipment suppliers are preferentially introduced in the treatment information presented to user client 3 from degradation diagnostic agent server 2; when a user makes a request to this equipment supplier for fulfillment of a prescription based on the treatment information, maintenance request selection section 28 communicates this request for fulfillment of the prescription based on the treatment information to the equipment supplier client 12 operated by the equipment supplier selected by the user without executing selection of an equipment supplier.

When user information is newly received by user information registration section 6, re-utilizable results output section 30 of degradation diagnostic agent server 2 accesses diagnostic results database 23 to determine whether the new environmental data and diagnostic specification are the same as or similar to information utilized in diagnosis that was previously received; if they are indeed the same or similar, a diagnostic result produced using the information that was previously received and utilized in diagnosis is read from diagnostic result database 23 and transmitted to user client 3.

FIG. 2 is a view illustrating an example of the stored contents of user information database 7. For each user, the desired diagnostic charge, equipment desired to be diagnosed, precision of diagnosis, and various types of environmental data are stored.

FIG. 3 is a view showing an example of the stored contents of diagnostic client information database 11. For each diagnostic service provider, the diagnostic charges, diagnosed equipment, precision of diagnosis, environmental data required for diagnosis and equipment information required for diagnosis are stored.

FIG. 4 is a view showing an example of the stored contents of environmental measurement client information database 19. For each environment measurer, the examination charge and environmental data capable being examined are stored.

FIG. 5 is a view showing an example of the stored contents of an equipment supplier client information database 15. For each equipment supplier, the type of equipment handled and its rating are stored.

Hereinbelow, the process of selecting a diagnostic service provider and an environmental measurer matching the user conditions by selection section 20 is described.

Figure 16:
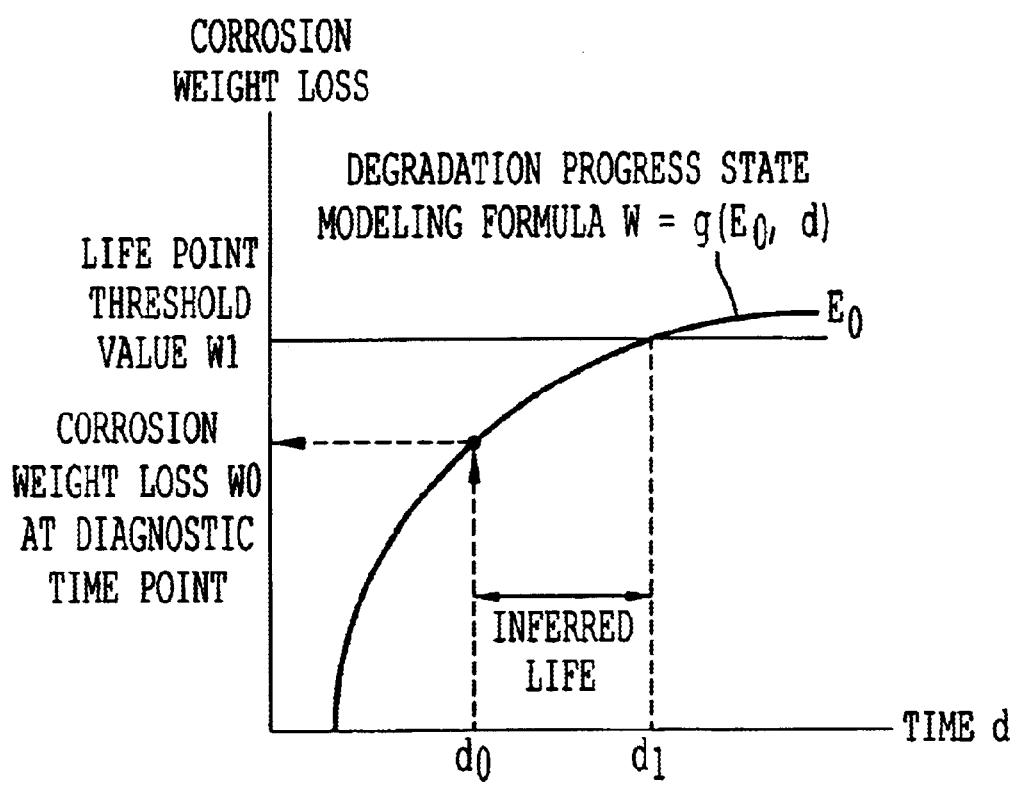
FIG. 16 is a view illustrating by way of example an altered condition of a degradation progress condition model formula.

FIG. 16 is a view showing diagrammatically information of some of the diagnostic service providers b1 to b4 registered in diagnostic client information database 11.

In this example, four diagnostic service provider companies b1 to b4 are registered in diagnostic client information database 11 and the environmental data that is required for diagnosis by the respective diagnostic service providers b1 to b4 is indicated by A to E.

For example, in the case of diagnostic service provider b1, only environmental data A, B are required for executing the diagnosis and C, D, E are not required; the fee for the diagnosis is Fa.

FIG. 7 is a view showing diagrammatically the information of some of the environmental measurers c1 to c5 registered in environmental measurement client information database 19.

In this example, five environmental measurer companies c1 to c5 are registered in environment measurement client information database 19 and the environmental data that can be examined by these respective environmental measurers c1 to c5 is indicated by A to E.

For example, in the case of environmental measurer c1, environmental data A, B, E can be examined but environmental data C, D cannot be examined; the fee for executing the examination is F1.

The user information is registered in user information database 2; if some of this user information has the content: "desired diagnostic fee: M", "environmental data that can be provided by the user: A, C", selection section 20 of degradation diagnostic mediation server 2 operates as follows.

First of all, the environmental data A, C received from the user is compared with the environmental data required by diagnostic service providers b1 to b4 shown in FIG. 6 above and environmental data that is deficient in respect of diagnostic service providers b1 to b4 is found.

FIG. 8 is a view showing diagrammatically the environmental data that is insufficient for diagnosis by diagnostic service providers b1 to b4. For example, if there are only environmental data A and C, it shows that environmental data B is deficient in respect of diagnosis by diagnostic service provider b1.

Next, based on the deficient environmental data, for the respective diagnostic service providers b1 to b4, environmental measurers capable of examining these deficient environmental data are selected from the above FIG. 7 and combinations of diagnostic service providers and environmental measurers capable of executing diagnosis are found.

Next, for each of the combinations of diagnostic service provider and environmental measurer found, the totals of diagnosis execution charge of the diagnostic service provider necessary for execution of diagnosis, the environmental measurement charge of the environmental measurer and the mediation fee m of the degradation diagnostic agent server 2 are listed in order of lowest cost, and the combinations for which the desired diagnostic fee registered by the user is no more than M are found. The combinations for which the desired diagnostic fee M is exceeded are also found.

FIG. 9 is a view showing diagrammatically the combinations of diagnostic service provider and environmental measurer capable of executing diagnosis and their diagnostic fees.

This content is transmitted to user client 3 from selection section 20 and presented to the user. If requested by the user, combinations for which the desired diagnostic fee M is exceeded are also presented.

By operating user client 3, the user selects a desired combination from the combinations of diagnostic service provider and environmental measurer and notifies this to selection section 20 of degradation diagnostic agent server 2.

Selection section 20 makes a request for execution of diagnosis to the diagnostic service provider based on the information which has been notified to it, or makes a request to the diagnostic service provider and environmental measurer for execution of diagnosis and environmental examination.

In this embodiment, if the diagnosis execution fee comprising the mediation fee m of degradation diagnostic mediation server 2 and/or the diagnosis agency execution fee is below the diagnostic fee desired by user, diagnosis mediation/diagnosis agency are executed. On the other hand, when the diagnosis execution fee exceeds the diagnostic fee desired by the user, mediation of diagnosis/diagnostic agency is not executed. However, even in this case, combinations of diagnostic service providers and environmental measurers needed to execute diagnosis and diagnostic execution fees based on combinations of diagnostic service providers and environmental measurers, even though these exceed the desired diagnostic fee, are presented to the user, so that if the user accepts fee alteration and requests diagnosis, diagnosis can be executed.

By executing the degradation diagnostic method of this embodiment as described above, the respective items of information of the diagnostic service providers, environmental measurers, and equipment suppliers can be managed, diagnostic service providers, environmental measurers, and equipment suppliers selected in accordance with a request from a user, and introduced to the user. Also, if agency authority for selection is given to the degradation diagnosis mediator by the user, selection of diagnostic service providers, environmental measurers, and equipment suppliers can be executed on an agency basis by the degradation diagnosis mediator. Degradation diagnosis is then executed by the selected diagnostic service provider, environmental measurer and equipment supplier and the diagnostic results presented to the user.

In this way, it is possible for the user to request the various types of service involved in degradation diagnosis solely from the diagnostic service providers, environmental measurers or equipment suppliers that satisfy conditions presented by the user himself.

Also, since the user can acquire degradation diagnosis results executed using the same or similar data from the diagnostic results database 23, the user can predict the results of the diagnosis the user has requested.

That is, according to this embodiment, a user can request diagnosis in accordance with the user's own conditions, and can therefore take suitable counter-measures against degradation of equipment based on the diagnostic results.

A mediation fee and/or registration fee can be collected by the degradation diagnosis mediator.

A diagnostic service provider can receive a diagnosis execution request and collect a diagnosis fee.

An environmental measurer can receive an environmental measurement request and collect an examination fee.

Equipment suppliers' sales opportunities for equipment are increased and they can receive maintenance requests.

It should be noted that, in this embodiment, if the fee exceeds the user's desired diagnostic fee and, although the diagnostic execution fee is presented to the user, the user does not accept fee alteration, diagnostic service providers that execute diagnosis with a cost not exceeding the user's desired diagnostic fee and environmental measurers that measure environmental data required by the diagnostic service provider at a cost not exceeding the user's desired diagnostic fee are disclosed to an unspecified large number of diagnostic service providers and environmental measurers through an information network such as the Internet, so a reverse auction can be executed on the network.

When a reverse auction is to be executed, before canvassing for information by the reverse auction, the user, registered diagnostic service providers and environmental measurers are notified beforehand of the information concerning the reverse auction. After this, the user's permission is confirmed and, if there are no new bids (alteration of diagnostic execution fee or environmental examination execution fee) by the diagnostic service providers or environmental measurers selected, canvassing in accordance with the reverse auction is executed.

In this way, parties who can execute the diagnosis for the user's desired diagnostic fee are canvassed, and mediation with the user or delegated execution of a diagnostic request can be executed.

It should be noted that use of the degradation diagnostic mediation server 2 in this embodiment could also be executed by the diagnostic service providers, environment measurers or equipment suppliers. Also, provision of diagnostic services, environmental measurement, or supply of equipment could be executed by the same parties such as for example environmental measurement also being executed by a diagnostic service provider.

Second Embodiment

In this embodiment, a degradation diagnostic method is described in which a service for executing environmental diagnosis of equipment, degradation diagnosis or life diagnosis is provided through the Internet. A characteristic feature of the method of degradation diagnosis according to this embodiment is that a diagnostic technique capable of constituting a de facto standard is published on the Internet, or a diagnostic database is established whereby data is shared on the Internet.

Figure 10:
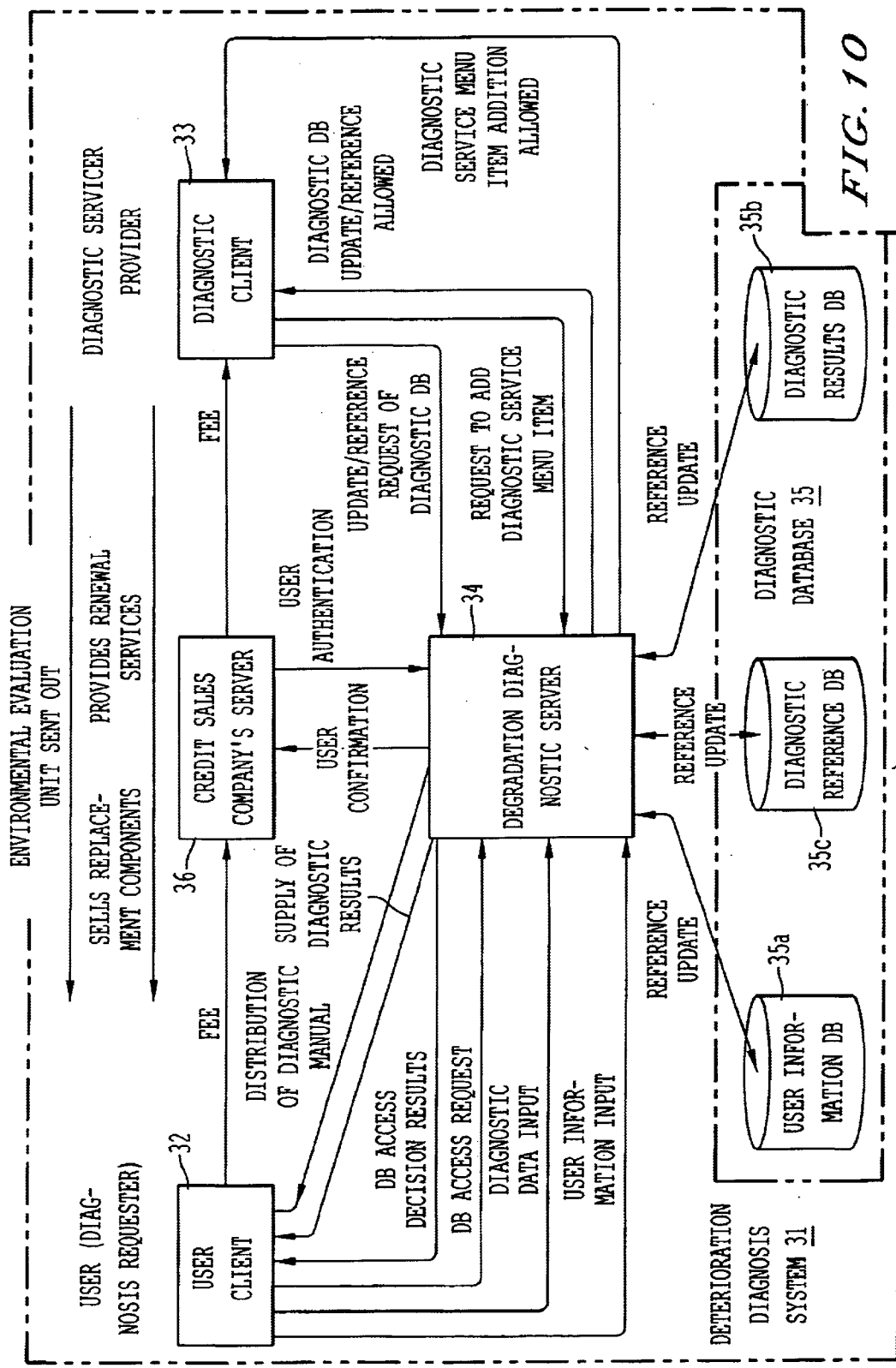
FIG. 10 is a view illustrating by way of example the diagrammatic layout of a degradation diagnostic system for implementing a degradation diagnostic method according to a second embodiment of the present invention.

FIG. 10 is a view illustrating by way of example the diagrammatic layout of a degradation diagnostic system for executing the degradation diagnostic method according to this embodiment.

This degradation diagnostic system 31 has a construction whereby a user client 32 constituting a user side interface i.e. the diagnosis requester, a diagnostic client 33 constituting a diagnostic service provider side interface, a degradation diagnostic server 34 that provides a diagnostic service by executing degradation diagnosis of equipment in response to a request from user client 32 using information from diagnostic client 33, and a diagnostic database 35 that holds data required for the provision of the diagnostic service and execution of diagnosis are present on the Internet, not shown. Also, in degradation diagnostic system 31, the server 33 of a credit sales company (settlement organization) manages payment of charges between user client 32 and diagnostic client 33.

Diagnostic database 35 comprises a user information database 35a that accumulates user information including name, affiliation, address, telephone number, mail address (e-mail address), and desired service, a diagnostic results database 35b that accumulates diagnostic cases (diagnostic results and diagnostic data) etc., and a diagnostic reference database 35c that accumulates information for diagnostic purposes that specifies the content of degradation diagnostic processing.

The information for diagnostic purposes includes for example the type of environmental factors utilized in degradation diagnostic processing, set references of environmental evaluation points, formulae for modeling the state of progress of degradation, and degradation-correlated information etc.

Environmental factors constitute elements of various types indicating environmental state. For example, environmental factors include: temperature, humidity, concentration of hydrogen sulphide, concentration of sulphur dioxide gas, concentration of NOx, concentration of chlorine, concentration of ammonia and degree of equipment soiling etc.

Environmental evaluation points are index values indicating the level of hostility (harmfulness) of the environment. These environmental evaluation points can be found for example by converting the values of environmental factors to numbers of points in accordance with a predetermined standard.

The formulae for modeling the state of progress of degradation are standardized numerical formulae for calculating the degree of degradation in accordance with environmental evaluation points.

Degradation-correlated information (degradation progress condition master curve) is information determining the relationship between the condition of progress of degradation and time, for example, for each environmental evaluation point and comprises various types of correlation curve for inferring the degree of degradation of equipment structural components/materials and remaining life.

The degradation diagnostic service provided by a degradation diagnostic system 31 as described above is described below.

First of all, a diagnostic service provider accesses degradation diagnostic server 34 by operating diagnostic client 33, and registers information for diagnostic purposes needed for execution of its own degradation diagnostic processing in diagnostic reference database 35c.

Next, a user accesses degradation diagnostic server 34 by operating user client 32 and registers the user's own user information in user information database 35a.

When this is done, a request for user confirmation is made to the server 36 of a credit sales company from degradation diagnostic server 34, using the credit card number included in the user information, and the result of the user verification from credit sales company server 36 is notified to degradation diagnostic server 34. If the user's credit card number is valid, degradation diagnostic server 34 distributes a diagnostic manual for executing diagnosis to this user's user client 32.

Next, the user information such as the user address and name is communicated to diagnostic client 33 that is operated by the diagnostic service provider from the degradation diagnostic server 34, and an environmental evaluation unit is sent to the user from the diagnostic service provider.

The environmental evaluation unit is a unit that accommodates, for example, reagents and measurement devices for measurement of the degree of hostility of the environment in which the equipment to be diagnosed is employed. The environmental evaluation unit includes, for example, a thermometer for measuring the temperature of the environment in which the equipment to be diagnosed is arranged, a humidity meter for measuring the humidity of this environment, an alkaline filter paper or metallic plate such as copper, silver or aluminum for evaluating the type and/or concentration of corrosive gases in this environment, acidic filter paper for evaluating the concentration of ammonium ions in this environment, and capturing gauze for evaluating sea salt particles in this environment etc.

The user uses this environmental evaluation unit to measure, for example, the temperature, humidity, concentration of hydrogen sulphide, concentration of sulphur dioxide gas, NOx concentration, concentration of chlorine, ammonia concentration and degree of soiling of the equipment and inputs these data (measured values) to degradation diagnostic server 34 by operating user client 32.

When this is being done, diagnostic reference database 35c is accessed by degradation diagnostic server 34 to find the values of the environmental factors by using the data input from user client 32 and the information for diagnostic purposes, to find the environmental evaluation points by using the values of the environmental factors and the information for diagnostic purposes, and to find the state of progress of degradation by using the environmental evaluation points and formulae for modeling the state of progress of degradation or degradation-correlated information.

The diagnostic results such as the state of progress of degradation found by the degradation diagnostic server 34 are stored in diagnostic results database 35b and output to user client 32 to be presented to the user.

When the user has been presented with the diagnostic results, the user accesses server 36 of the credit sales company by operating user client 32 and executes the procedure for payment of the diagnostic fees. When this done, the charges paid by the user are presented to the diagnostic service provider.

Additionally, the diagnostic service provider may execute as appropriate supplementation/replacement of components of the diagnostic evaluation unit sent to the user. Also, when the degradation diagnostic processing which the diagnostic service provider provides needs to be updated, the diagnostic service provider provides the user with a new unit for measuring the data necessary for degradation diagnosis processing. Furthermore, the diagnostic service provider that provides the new degradation diagnostic processing makes a request to degradation diagnostic server 34 for updating/referencing of diagnostic reference database 35c and, if this is allowed, registers information for diagnostic purposes specifying the content of menu information or new degradation diagnostic processing for providing new degradation diagnostic processing in diagnostic reference database 35c either through degradation diagnostic server 34 or directly.

Let us now assume that another user requests access to diagnostic results database 35b from degradation diagnostic server 34 by operating the user's own user client 32. When this is done, the diagnostic results stored in this diagnostic results database 35b are accessed by a degradation diagnosis server 34 and these diagnostic results are provided to the user client operated by the other user that made an access request. The other user can thereby infer the state of degradation of the user's own equipment by referring to diagnostic results for equipment of the same type as the user's own equipment.

Figure 11A:
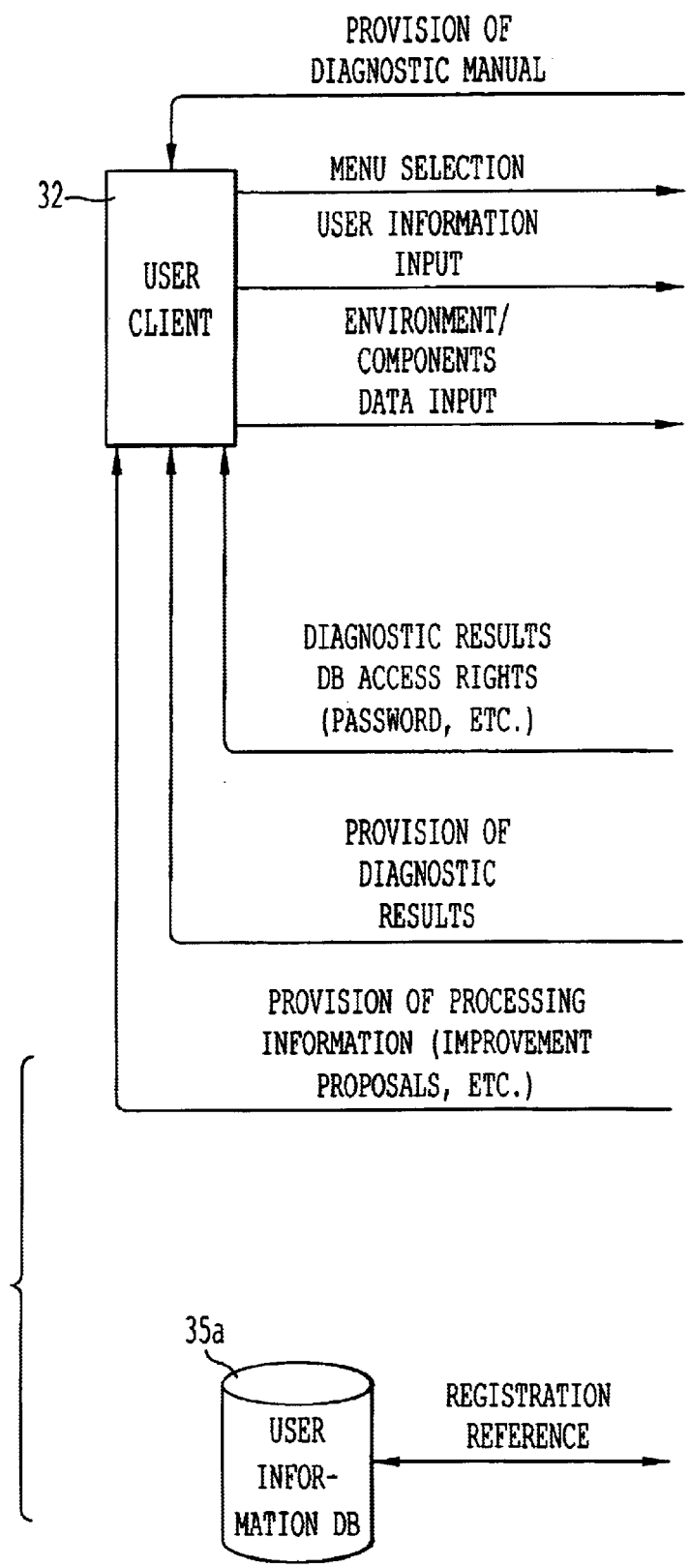
FIG. 11 is a view illustrating an example of the display of a menu screen provided to a user by a degradation diagnostic server.
Figure 11B:
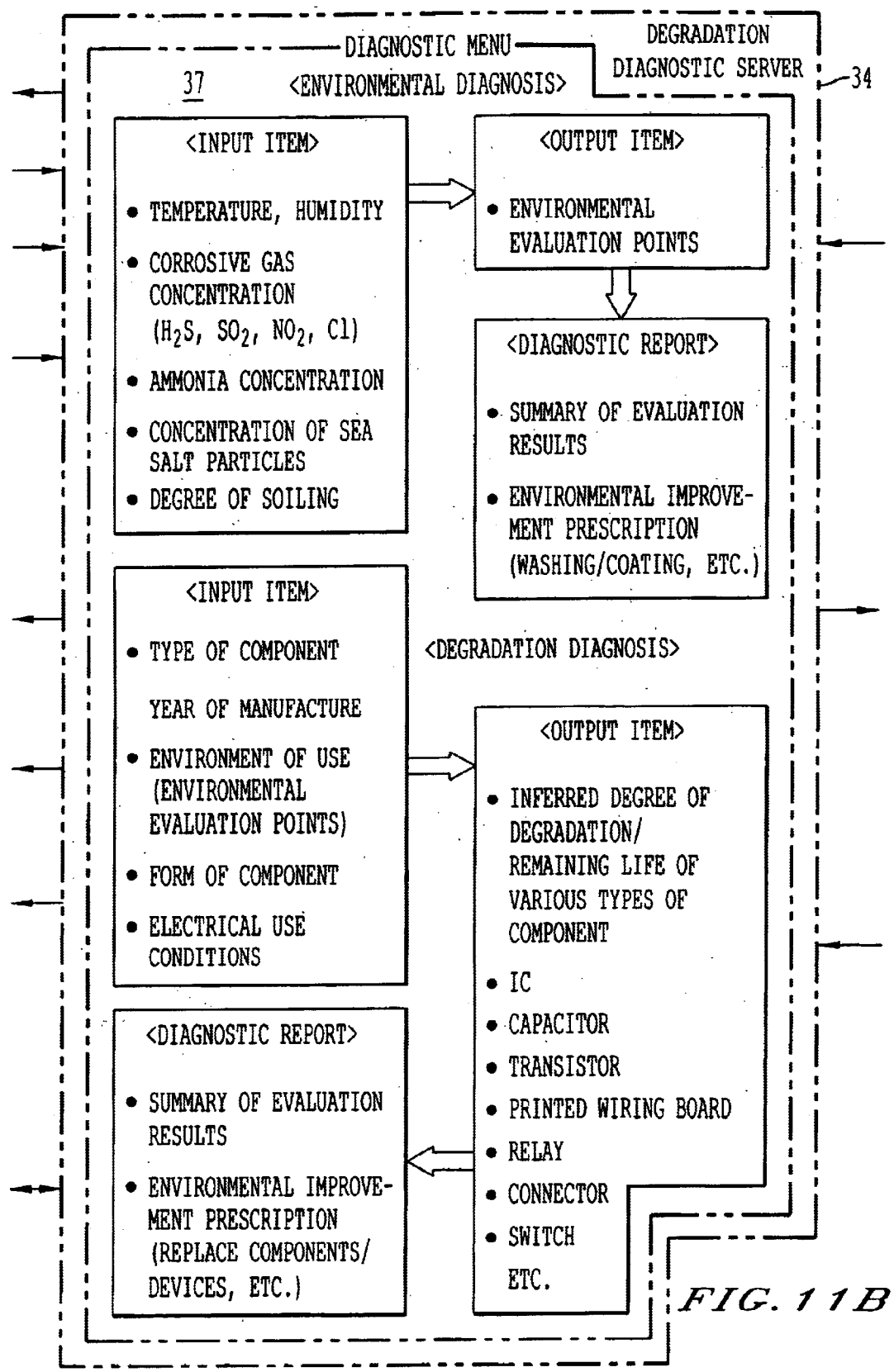
Figure 11C:
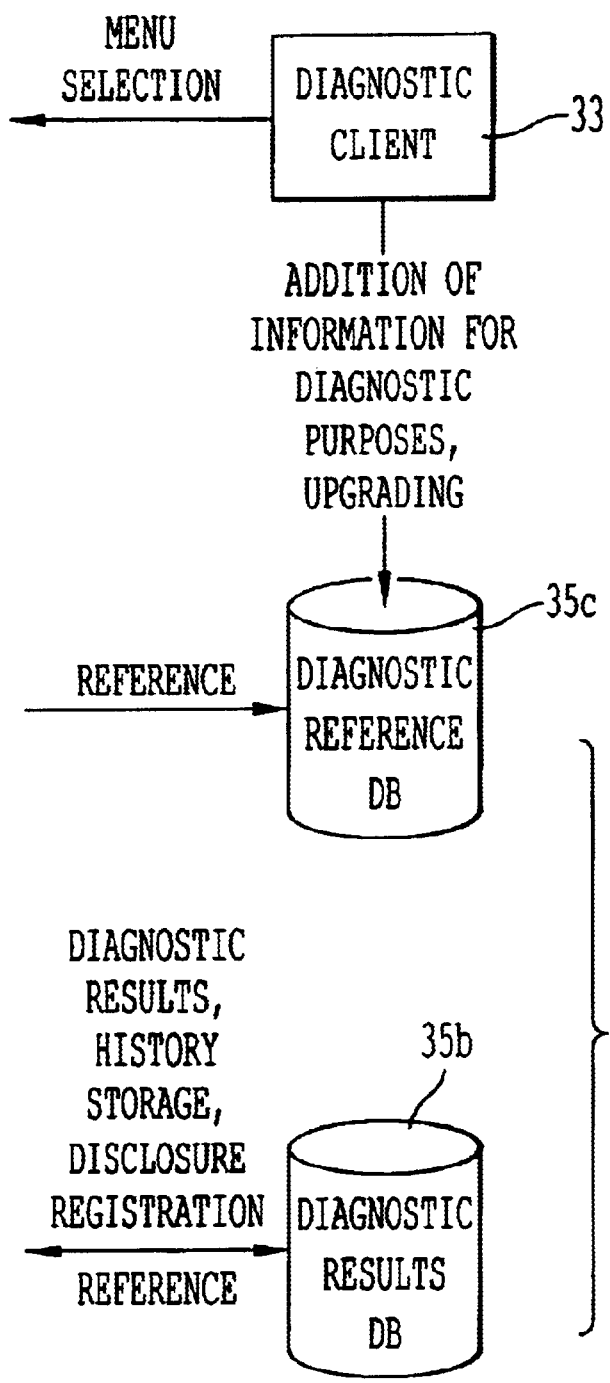

FIG. 11 is a view illustrating an example of a menu screen presented to a user by degradation diagnostic server 34.

Degradation diagnostic server 34 holds information (such as, for example, information in home page form) displaying a diagnostic menu 37 when read into a browser. When the browser of user client 32 reads this information, diagnostic menu 37 is displayed.

The user executes a selection operation while referring to the diagnostic menu 37 on user client 32. The items of the diagnostic menu 37 include, for example, "environmental diagnosis" in which the atmospheric corrosion level of the environment in which the equipment is arranged and/or its degree of soiling are quantitatively diagnosed by deriving environmental evaluation points for the equipment environment and "degradation diagnosis" in which the degree of degradation or life of the components of the equipment is derived from the environmental evaluation points. In addition to these, "degradation diagnosis of various types of components" may be provided as an item of diagnostic menu 37. When this item "degradation diagnosis of various types of component" is selected and data such as the type and year of manufacture of the components, environment of use, form of compounds, and electrical conditions of use etc. are input to degradation diagnostic server 34, degradation diagnostic server 34 compares this input data with past diagnostic results and derives the inferred degree of degradation or remaining life of the various components (ICs, capacitors, transistors, printed circuit boards, relays, connectors, switches etc.).

In addition, "refer to previous diagnostic cases" may be provided as an item of diagnostic menu 37. If this "refer to previous diagnostic cases" is selected, it becomes possible to refer to previous diagnostic results published and recorded in diagnostic results database 35b, so a diagnostic result can be obtained without actually executing degradation diagnosis.

Degradation diagnostic server 34 summarizes the results concerning "environmental diagnosis" or "degradation diagnosis" in the form of a diagnostic report which is stored in diagnostic results database 35b; in addition, information concerning counter-measures such as environmental improvement measures or equipment improvement measures derived from the diagnostic results is output to user client 32.

When one or other of the diagnostic items of diagnostic menu 37 is clicked, degradation diagnostic server 34 requests input of the data required for the selected item from the user operating user client 32.

Figure 12A:
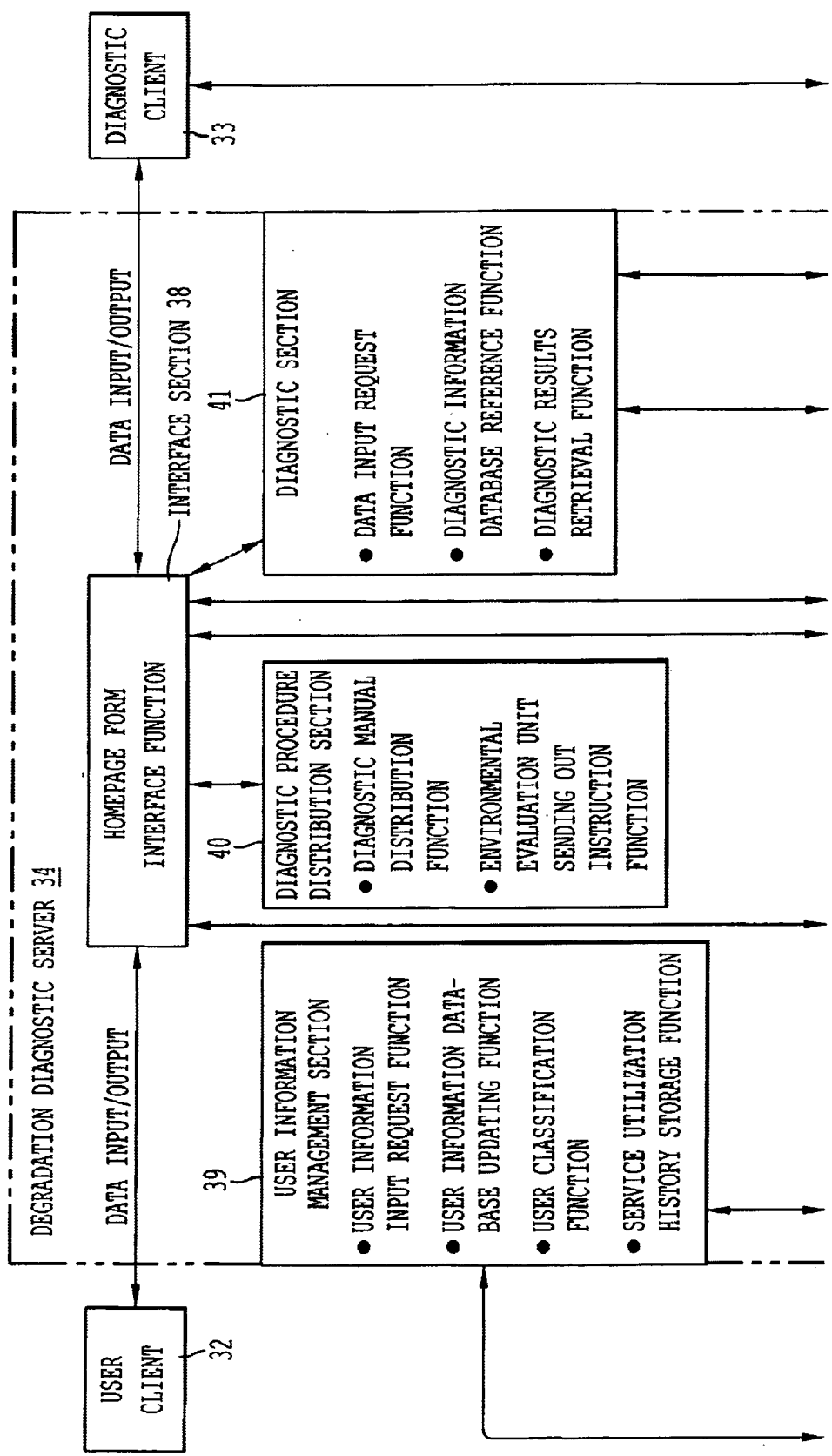
FIG. 12 is a block diagram illustrating an example of the layout of a degradation diagnostic server.
Figure 12B:
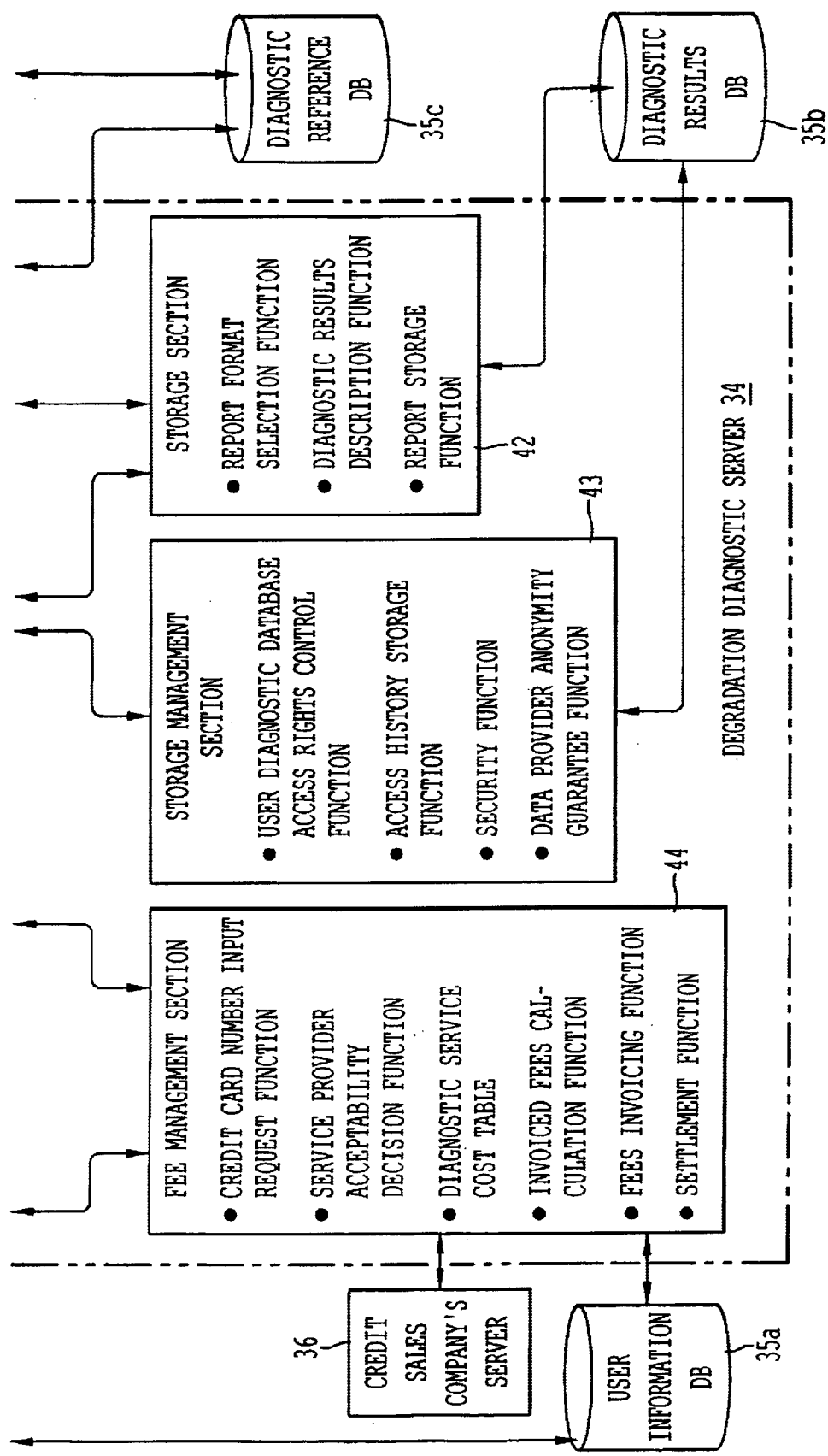

FIG. 12 is a block diagram illustrating an example layout of degradation diagnostic server 34.

Degradation diagnostic server 34 chiefly comprises interface section 38, user information management section 39, diagnostic procedure distribution section 40, diagnostic section 41, storage section 42, storage management section 43, and fee management section 44.

Interface section 38 handles input/output between user client 32 and diagnostic client 33 in the form of a home page.

User information management section 39 manages the user information required for providing the diagnostic service. Specifically, user information management section 39 executes a function of requesting input of user information when a user who has accessed degradation diagnostic server 34 desires some diagnostic service, a function of updating user information database 35a in accordance with input user information, a user classification function of setting user access rights to the diagnostic database 35 for each service desired by the user and a function of storing user service utilization history.

By the operation of this user information management section 39, user information required for a user to receive diagnostic information is set for each diagnostic service, and the user thereby becomes capable of utilizing the service. Also, the user information input from users by this user information management section 39 is managed in unified fashion by user information database 35a.

Diagnostic procedure distribution section 40 distributes a diagnostic procedure such that the data needed for diagnosis can be prepared at the user end. Specifically, this diagnostic procedure distribution section 40, when a user whose user information is registered wishes to execute the diagnosis, executes a function of distributing to this user a diagnostic manual describing a method of on-site evaluation of the environment around the equipment and a function of issuing to the responsible department instructions for sending an environmental evaluation unit to users who have requested this, of the users to whom the manual has been distributed.

The user prepares the data for input to the degradation diagnosis server 34 by making a choice of collecting data by independently preparing samples for environmental evaluation in accordance with the diagnostic manual downloaded from the degradation diagnostic server 34, or by acquiring data by employing the services of a specialist, or by receiving delivery of an environmental evaluation unit from the diagnostic service provider and collecting the data using this.

Diagnostic section 41 derives the diagnostic results by using the data input by the user and data stored in diagnostic database 35. Specifically, this diagnostic section 41, when a user whose user information has been registered desires execution of diagnosis, executes a function of requesting input from the user of data needed for the diagnostic items selected by the user, a function of selecting a degradation progress state modeling formula or degradation-correlated information from diagnostic reference database 35c in accordance with the input data, and a function of deriving diagnostic results by substituting the input data in the selected degradation progress state modeling formula or degradation-correlated information.

An example of degradation-correlated information is a time sequence variation curve of IC aluminum pattern corrosion in which the amount of corrosion that renders the IC defective in operation is defined as the life point corrosion amount. In this case, respective correlation curves are stored in diagnostic reference database 35c for each type of IC component. Apart from this, cases may be considered wherein, for example, the corrosion rate of the metallic material in respective atmospheric environments and the amount of corrosion of metallic materials that defines the component life are stored in diagnostic reference database 35c and the life is inferred by inputting the amount of corrosion at the diagnostic time point as data.

In storage section 42 the diagnostic results are collected and a diagnostic report is prepared. Specifically, storage section 42 executes a function of selecting from diagnostic result database 35b a report format in accordance with the service desired by the user, a function of setting out diagnostic results in a format and a function of storing in diagnostic results database 35b reports that have been prepared.

By the action of this storage section 42, the diagnostic results found by diagnostic section 41 are collected into report form and stored in diagnostic database 35; this degradation diagnostic server 34 makes the report viewable through the Internet and the report may be transmitted by fax distribution.

Storage management section 43 manages reference/updating of diagnostic database 35 in accordance with requests from user client 32 and/or diagnostic client 33. Specifically, this storage management section 43 executes a function of controlling access rights of users to diagnostic database 35 in accordance with access rights of users to diagnostic database 35 set by a user classification function, a function of storing user access history of diagnostic database 35, a security function of excluding users that illicitly access diagnostic database 35 from user information database 35a, and a function of ensuring anonymity of providers of these diagnostic results when the diagnostic results are referred to.

By the action of this storage management section 43, if a user only desires environmental diagnostic service, only use of the data relating to environmental diagnosis, of the storage contents of diagnostic database 35, is permitted and the user cannot access data relating to degradation diagnosis. Also, if a user only desires a service of referencing past cases of diagnosis, the user can only refer to the desired data in question in the diagnostic results database 35b: access rights to data other than this or execution of environmental diagnosis or execution of degradation diagnosis are denied. Thus, the user's access condition is continually managed and a user who repeats illicit access is deemed to be a user executing illicit access and is excluded.

Fee management section 44 determines the fees invoiced to a user operating user client 32 and/or a diagnostic service provider operating diagnostic client 33 in accordance with the content of the service and executes settlement procedure. Specifically, fee management section 44 executes a function of requesting input of a credit card number from a user desiring to utilize the diagnostic service, a function of ascertaining permission of service provision by confirming the input credit card number on server 36 of the credit sales company, a function, if service is provided, of calculating invoiced fees from a diagnostic service price table and the service utilization history of the user stored in user information management section 39, a function of invoicing the calculated fees, and a settlement function of confirming the situation in regard to payment processing and determination of completion of the transaction.

Thanks to the action of this fee management section 44, even if a user's user information is registered by accessing degradation diagnostic server 34 so that the user is capable of utilizing this degradation diagnostic server 34, this service cannot be received unless a decision of permission of service provision has been obtained by inputting the credit card number immediately prior to provision of the service that is being charged for. Distribution of the environmental evaluation unit or diagnostic manual is also not executed unless a decision of permission of service provision has been obtained.

Also, even when degradation diagnostic processing is executed by degradation diagnostic server 34, display of the diagnostic results is put in a holding condition until a decision of permission of service provision has been obtained and the diagnostic results are only displayed after the decision of permission of service provision has been obtained. This calculation of fees is executed by referring to the table of prices and service utilization history; the decision of permission of service provision is achieved by online confirmation with the server 36 of the credit sales company. Basically, fee invoicing and settlement are executed in accordance with the know-how of the credit sales company.

A detailed description of the specific content of degradation diagnostic processing executed by diagnostic section 41 of degradation diagnostic server 34 in accordance with information for diagnostic purposes stored in diagnostic reference database 35c is given below with reference to the drawings.

The degradation diagnostic method set out in Japanese Patent Application Number 2000-251355 can be utilized as a specific example of degradation diagnostic processing executed by diagnostic section 41 in accordance with the information for diagnostic purposes.

First of all, diagnostic section 41 inputs the values of various environmental factors indicating the condition of the environment in which the equipment to be diagnosed is arranged (for example, temperature, humidity, concentration of hydrogen sulphide, sulphur dioxide gas concentration, chlorine concentration, ammonia concentration and degree of soiling of the equipment etc).

Next, diagnostic section 41 reads from diagnostic reference database 35c the environmental range table 45 of JEIDA-63 (Revision as of July, 2000) shown in FIG. 13 and the weighting factor Table 46 of environmental factors shown in FIG. 14, and calculates the environmental evaluation points=$A+B+C1+C2+C3+C4+C5+D$ from the values of the various environmental factors.

Next, diagnostic section 41 infers the state of progress of degradation (corrosion weight loss of the metal) of the metallic material of the equipment by referring to corrosion progress state and modeling formula W (this is, for example, a function of the environmental evaluation value e and time d, being a function of the amount of metallic corrosion weight loss wherein the amount of corrosive weight loss of metal becomes larger as the environmental evaluation value e or time d becomes larger) in diagnostic reference database 35c, using the calculated environmental evaluation points.

Figure 15:
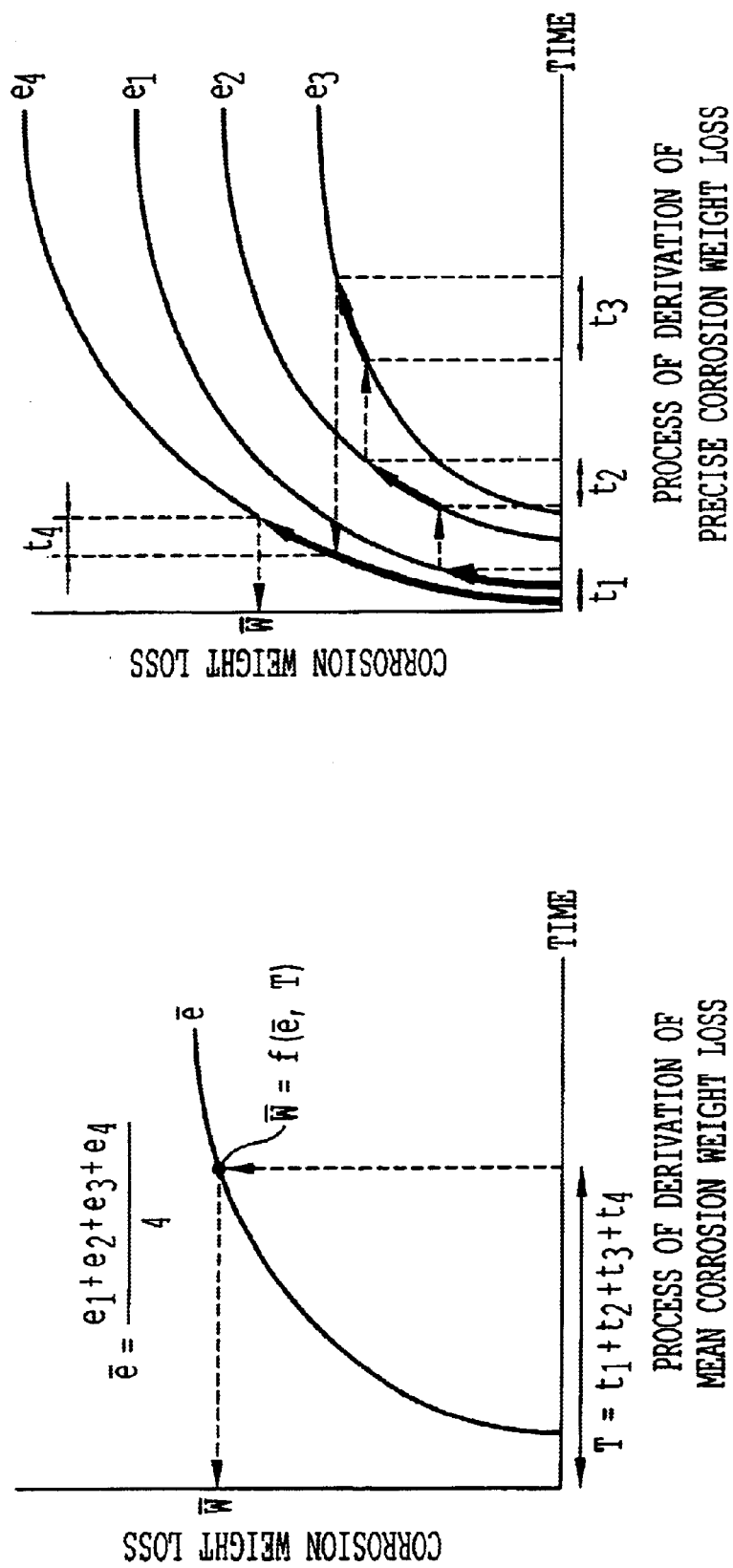
FIG. 15 is a view illustrating by way of example a step of deriving corrosion weight loss.

For example, as shown in FIG. 15A, diagnostic section 41 calculates the average environmental evaluation points in a given period, and infers the current and subsequent state of progress of degradation assuming that these continue in the future as in the past.

It should be noted that, as shown in FIG. 15B, the state of degradation progress may be inferred by calculating successively the environmental evaluation points at desired time points, reflecting the past history of the environmental evaluation points. In this way, the state of progress of degradation can be predicted more accurately than by predicting the average state of progress of degradation as in FIG. 15A described above, by inferring the state of progress of degradation reflecting past history.

Next, diagnostic section 41 reads the limiting thickness of the metallic location converted into database form for each item of equipment/type of component in the form of a life point threshold value from diagnostic reference database 35c. Then, it calculates the remaining life by fitting the threshold value and the state of progress of degradation at the current time point with degradation progress state modeling formula W. For example, as shown in FIG. 16, with a given equipment to be diagnosed, if the degradation progress state modeling formula is W=g(E, D), the current environmental evaluation point is $E_0$, the state of degradation progress is $W_0$, and the life point threshold value is $W_1$, the remaining life is calculated as $d_1-d_0=g^{-1}(E_0, W_1)-g^{-1}(E_0, W_1)$.

It should be noted that, instead of the degradation progress state modeling formula, a degradation progress state master curve expressing for each environmental evaluation point the relationship between the state of degradation progress and time could be employed.

As other examples, the diagnostic methods set out in Japanese Patent Application Number 2000-255957 or Japanese Patent Application Number 2000-024321 described above could be utilized. These diagnostic methods are described below.

The operation of diagnostic section 41 up to obtaining the values of the environmental factors is the same as in the case described above.

In this example, diagnostic section 41 refers to environmental evaluation points range table 47 as shown in FIG. 17 to extract evaluation points for each environmental factor and calculates the environmental evaluation points by totaling the evaluation points of each environmental factor.

Environmental evaluation points range table 47 is divided into five classes depending on the value of the environmental factors, and evaluation points are allocated to each class. In this environmental evaluation points range table 47, temperature, humidity, corrosive gases (amount of sulphur-based gases such as $SiO_2$ or $H_2S$, amount of nitrogen oxide gases such as $NO_2$, amount of chloride gases such as $Cl_2$ or HCl and amount of $NH_3$ gas) and sea salt particles (amount of sea salt particles, distance from the coast) are treated as environmental factors that have an effect on the degree of corrosion.

It should be noted that, rather than acquiring environmental evaluation points from the values of environmental factors by utilizing a table as described above, it would be possible to store a function whereby environmental evaluation points are acquired from the values of environmental factors in diagnostic reference database 35c and to use this.

Figure 18:
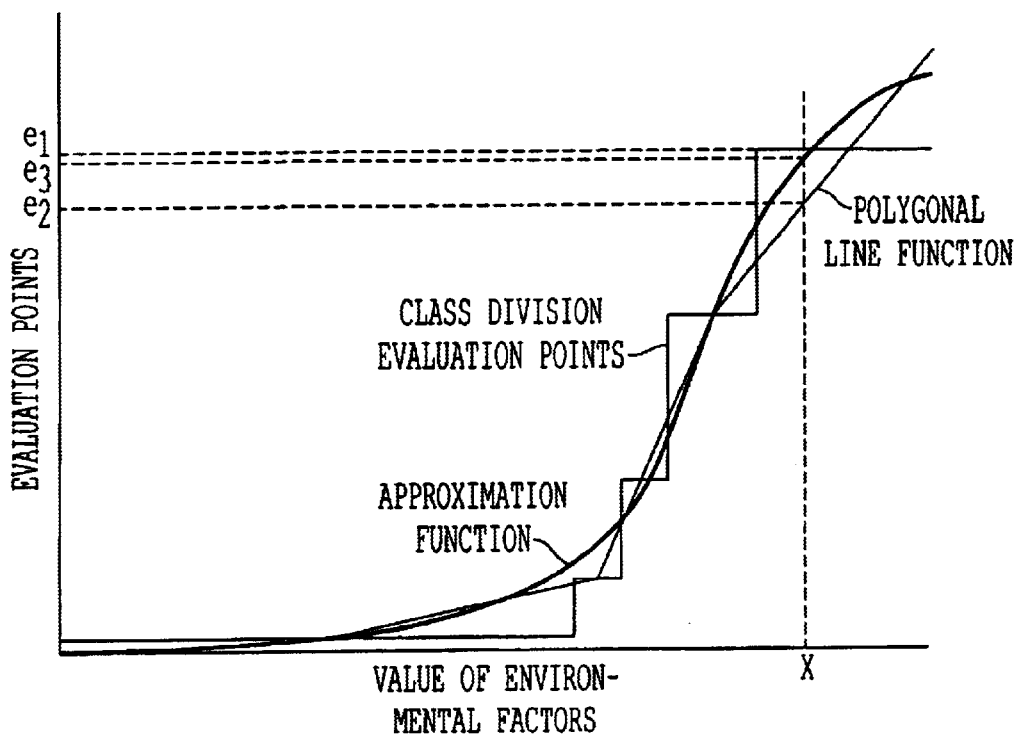
FIG. 18 is a view illustrating an example of a function for calculating environmental evaluation points from the values of environmental factors.

FIG. 18 is a view showing an example of a function for calculating environmental evaluation points from values of environmental factors. This FIG. 18 shows a polygonal line function that passes through the central values of the classified environmental factors and the evaluation points at these central values, and also an approximation function approximating this polygonal line function.

For example, if the value of a given environmental factor B is x, the evaluation point obtained by using the above environmental evaluation point range table 47 is $e_1$, but the evaluation point obtained by using the polygonal line function is $e_2$ and the evaluation point obtained by the approximation function is $e_3$. The evaluation points can be calculated more accurately by utilizing such functions.

Also, environmental evaluation point E could be calculated by an expression (1) by storing weighting coefficients $k_i$ of the evaluation points for each environmental factor i in diagnostic reference database 35c, utilizing these weighting coefficients $k_i$ of the environmental factors i and evaluation values $e_i$ of each environmental factor.

$$E = \sum_{i=1}^{n} ki \cdot ei \quad (1)$$

Next, diagnostic section 41 uses the calculated environmental evaluation points to calculate a degradation progress state modeling formula such as, for example, a corrosion weight loss function or corrosion speed function for each type of metal. A metal corrosion weight loss function is a function W=g(E, d) as described above of environmental evaluation points E of the environment in which the equipment to be diagnosed is arranged and the time d for which it has been arranged therein.

Figure 19:
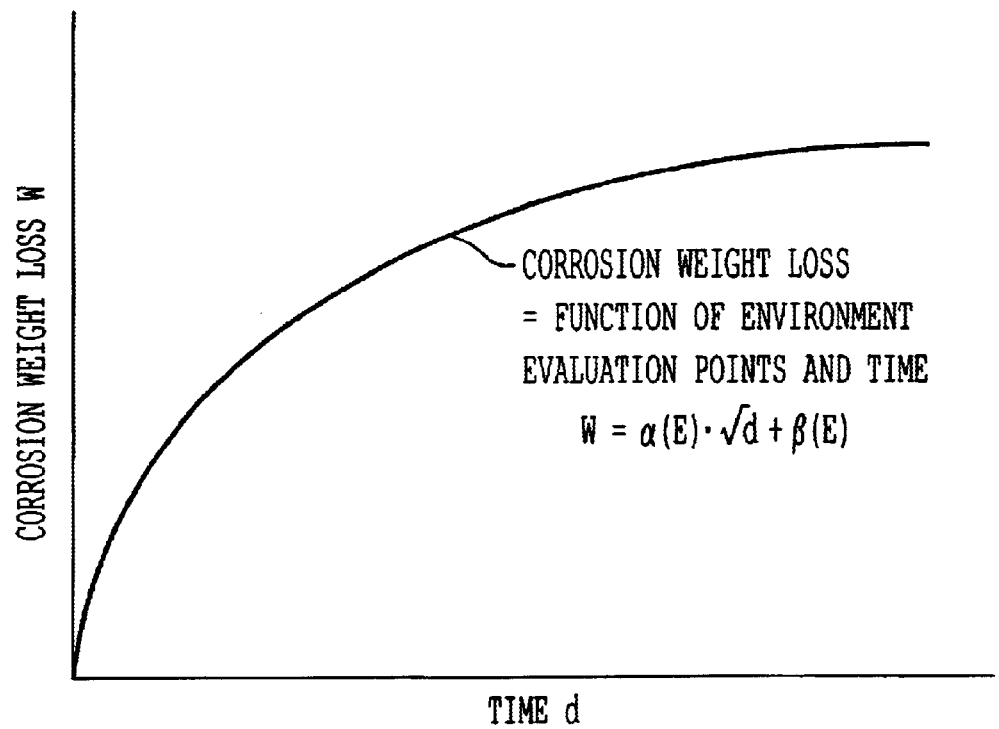
FIG. 19 is a view illustrating change of the corrosion weight loss function.

A typical corrosion weight loss function is expressed as a linear expression of the square root of the time d as shown in FIG. 19; the coefficient of the linear expression may be described as a polynomial of the environmental evaluation points. Specifically, if the coefficient of the linear expression are respectively taken to be α and β, the metal corrosion weight loss function is expressed by the following expression (2).

$$W=\alpha(E) \cdot \sqrt{\sqrt{d}}+\beta(E) \quad (2)$$

The terms and coefficients of the polynomials α and β of the environmental evaluation points E are different depending on the type of metal; the terms and coefficients for each metal are stored in diagnostic reference database 35c.

The metal corrosion rate function may be found by differentiating this metal corrosion weight loss function indicated by this expression (2). Specifically, the metal corrosion rate function is $dW/dt=f(E, d)=\alpha(E)^2/(W-\beta(E))$.

Consequently, diagnostic section 41 can find the corrosion weight loss and corrosion rate from the environmental evaluation points E and time d and so can infer to what extent corrosion has progressed.

Also, when there is a limit on the corrosion weight loss, the time to reach the limiting value from the current condition i.e. the remaining life can be inferred using the corrosion weight loss function and corrosion rate function.

Also, instead of a degradation progress state modeling formula as described above, by utilizing a degradation progress state master curve, relating the degradation progress state of the metal and the time, for each environmental evaluating point in respect of each of the metals, the time to reach the limit from the current degradation progress state can be found as the remaining life.

Also, the relationship between the amount of corrosion of the metal and the corrosion thickness of this metal of the equipment to be diagnosed is examined at each prescribed time and this relationship is stored beforehand in diagnostic database 8. If this is done, degradation diagnostic function 5c can infer the corrosion thickness of this metal in the equipment to be diagnosed after time t corresponding to the amount of corrosion after time t by using this function.

Also, the corrosion area ratio can be calculated from the amount of corrosion of the metal by using a correlation function of the amount of corrosion of the metal and the corrosion area ratio of this metal of the equipment to be diagnosed. This correlation function can be found from the time sequence variation curve of the corrosion area ratio of the metal.

Also, the corrosion area ratio can be calculated from the corrosion rate of the metal using a correlation function of the corrosion rate of the metal and the corrosion area ratio of this metal of the equipment to be diagnosed.

Also, the failure rate of the equipment to be diagnosed can be found using a relationship curve of the failure rate and the amount of corrosion of the metal and a relationship curve of the failure rate and the corrosion area of the metal.

Also, the remaining life of the equipment to be diagnosed can be inferred by finding the degree of soiling from the correlation curve of environmental evaluation points of the metal and degree of soiling, using a relationship curve of the time until the equipment to be diagnosed fails and the degree of soiling.

When the degradation diagnostic method according to this embodiment as described above is executed, the diagnostic know-how of the diagnostic service providers is published on the Internet and the data needed for degradation diagnosis of equipment or the environment of the equipment is collected by the users themselves. Thus, diagnostic results can easily be obtained by the users themselves using the published diagnostic know-how and the collected data.

Consequently, the need for on-site data collection by technicians of the diagnostic service provider is eliminated, so the labor costs of the diagnostic service provider, the cost of having technicians on standby and call-out costs can be reduced. Also, the time from the user requesting diagnosis until a diagnostic result is obtained is shortened. Also, if the user merely collects the data, diagnostic results can be obtained with a schedule desired by the user irrespective of the convenience of the diagnostic service provider and the period of diagnosis can thus be matched with the period desired by the user.

Also, by executing the degradation diagnostic method according to this embodiment, the information of the user who desired the diagnosis can be acquired by collecting user information. Also, since access rights (read only/write only/ addition-enabled etc.) to the diagnostic database 35 are managed in accordance with the user information, the allowed range of services provided to the user can be managed and security can thereby be increased.

Also, when the degradation diagnostic method according to this embodiment is executed, since information such as the results of previous degradation diagnosis stored in diagnostic database 35 can be shared between users, it is possible to prevent the same or similar diagnoses from being repeatedly carried out, thereby enabling the efficiency of degradation diagnosis to be increased.

In this embodiment, information for diagnostic purposes based on the respective individual diagnostic know-how of a plurality of diagnostic service providers is registered in diagnostic reference database 35c and, of this registered information for diagnostic purposes, the user selects information for diagnostic purposes that specifies degradation diagnostic processing which the user desires; thus, the user can also execute degradation diagnostic processing based on this selected information for diagnostic purposes.

Third Embodiment

In this embodiment, business methods are described that are implemented by a degradation diagnostic system 1 described in the second embodiment.

Figure 20:
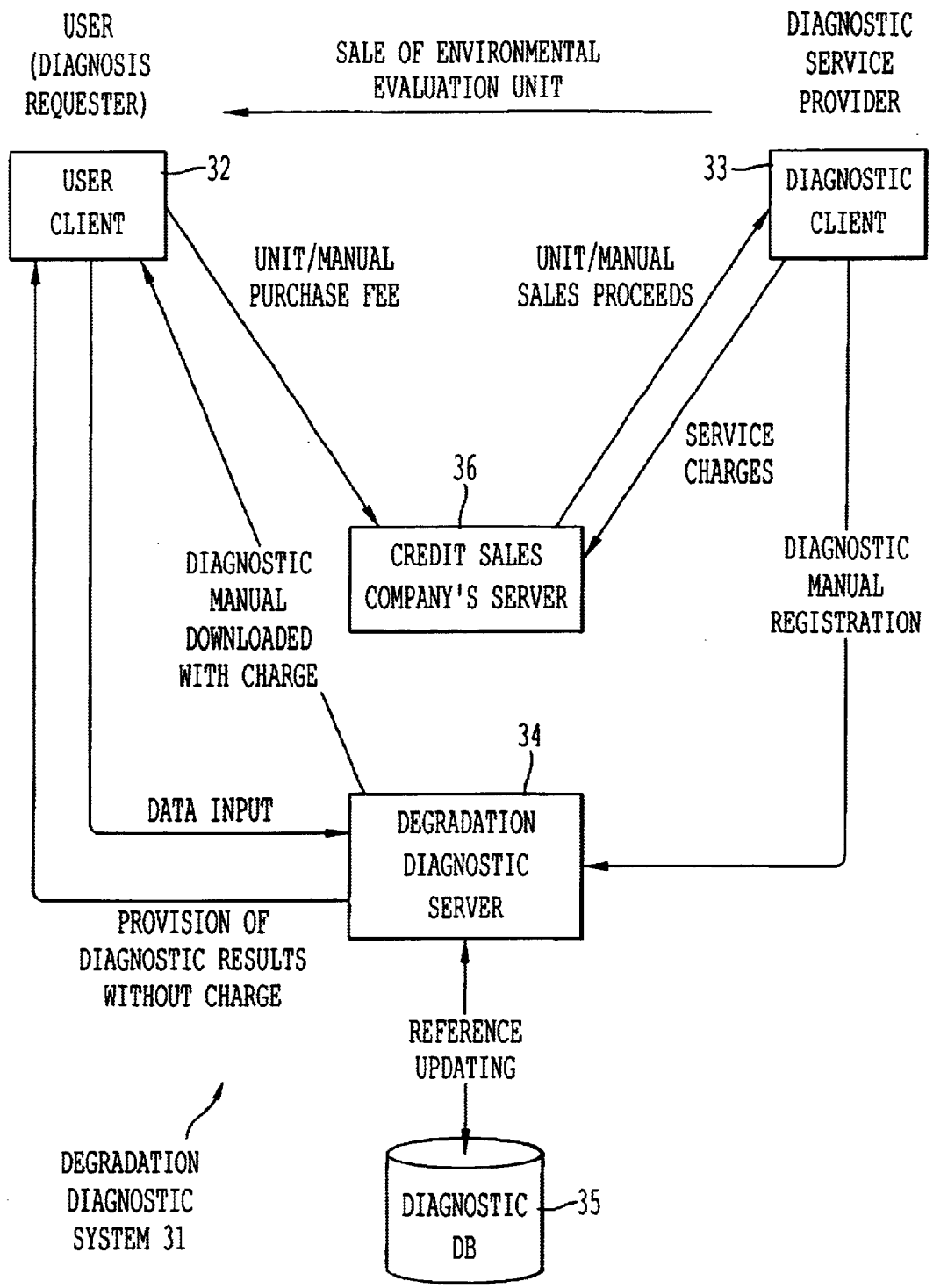
FIG. 20 is a block diagram illustrating a first business method implemented by a degradation diagnostic system.

FIG. 20 is a block diagram illustrating a first business method executed by degradation diagnostic system 31.

In this first business method, a diagnostic manual is stored beforehand in diagnostic database 35 that is accessed by degradation diagnostic server 34.

When a user makes a request for distribution of an environmental evaluation unit, the diagnostic service provider sells the environmental evaluation unit to this user.

When a diagnosis requester requests downloading of a diagnostic manual, the diagnostic manual of diagnostic database 35 is downloaded to the user client 32 operated by the user from degradation diagnostic server 34 and supplied to the user.

In this first business method, the environmental evaluation unit and diagnostic manual are provided to the user on a chargeable basis. The diagnostic service provider can therefore obtain profit thereby. Also, the diagnostic service provider pays charges to the credit sales company.

A user who purchases an environmental evaluation unit or downloads a diagnostic manual pays the purchase charges to the diagnostic service provider that operates the diagnostic client 33 via the credit sales company's server 36 by operating user client 32.

By operating user client 32, the user inputs data collected using the environmental evaluation unit or diagnostic manual to the home page of the degradation diagnostic server 34 and thereby obtains diagnostic results without charge from the degradation diagnostic server 34.

By executing this first business method, the user can acquire diagnostic know-how (environmental evaluation unit and diagnostic manual) and, by accessing degradation diagnostic server 34 through the Internet, can obtain without charge a diagnostic report, even at a remote location, by inputting the collected data to degradation diagnostic server 34.

Also, the diagnostic service provider can obtain profit by selling the environmental evaluation unit and diagnostic manual.

Figure 21:
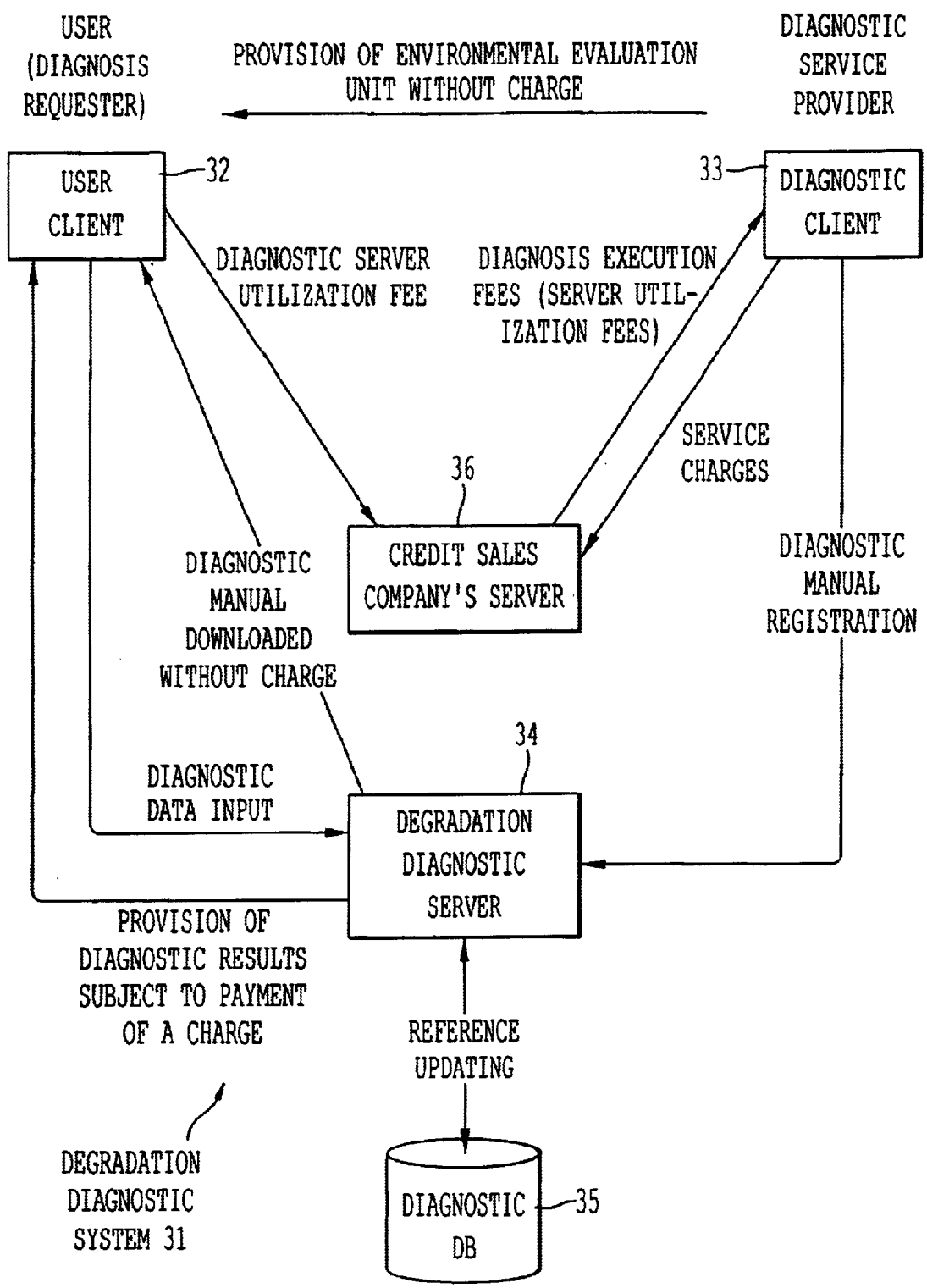
FIG. 21 is a block diagram illustrating a second business method implemented by a degradation diagnostic system.

FIG. 21 is a block diagram illustrating a second business method.

This second business method is similar to the first business method described above. However, it differs from the first business method described above in that, with this second business method, the environmental evaluation unit or diagnostic manual is provided to the user without charge. However, this second business method has the characteristic that a user who has obtained diagnostic results from this degradation diagnostic server 34 by inputting to the home page of degradation diagnostic server 34 pays diagnostic service usage fees to the diagnostic service provider through server 36 of the credit sales company.

By executing this second business method, a user can acquire an environmental evaluation unit or diagnostic manual without charge and can obtain a diagnostic report even in a remote location by accessing degradation diagnostic server 34 through the Internet by operating user client 32 and inputting collected data from user client 32 to degradation diagnostic server 34.

Also, the diagnostic service provider can obtain profit by invoicing to the user service usage fees of various types relating to the diagnostic service provided to the user by degradation diagnostic server 34, diagnostic report preparation service, and diagnostic cases provision service etc.

Figure 22:
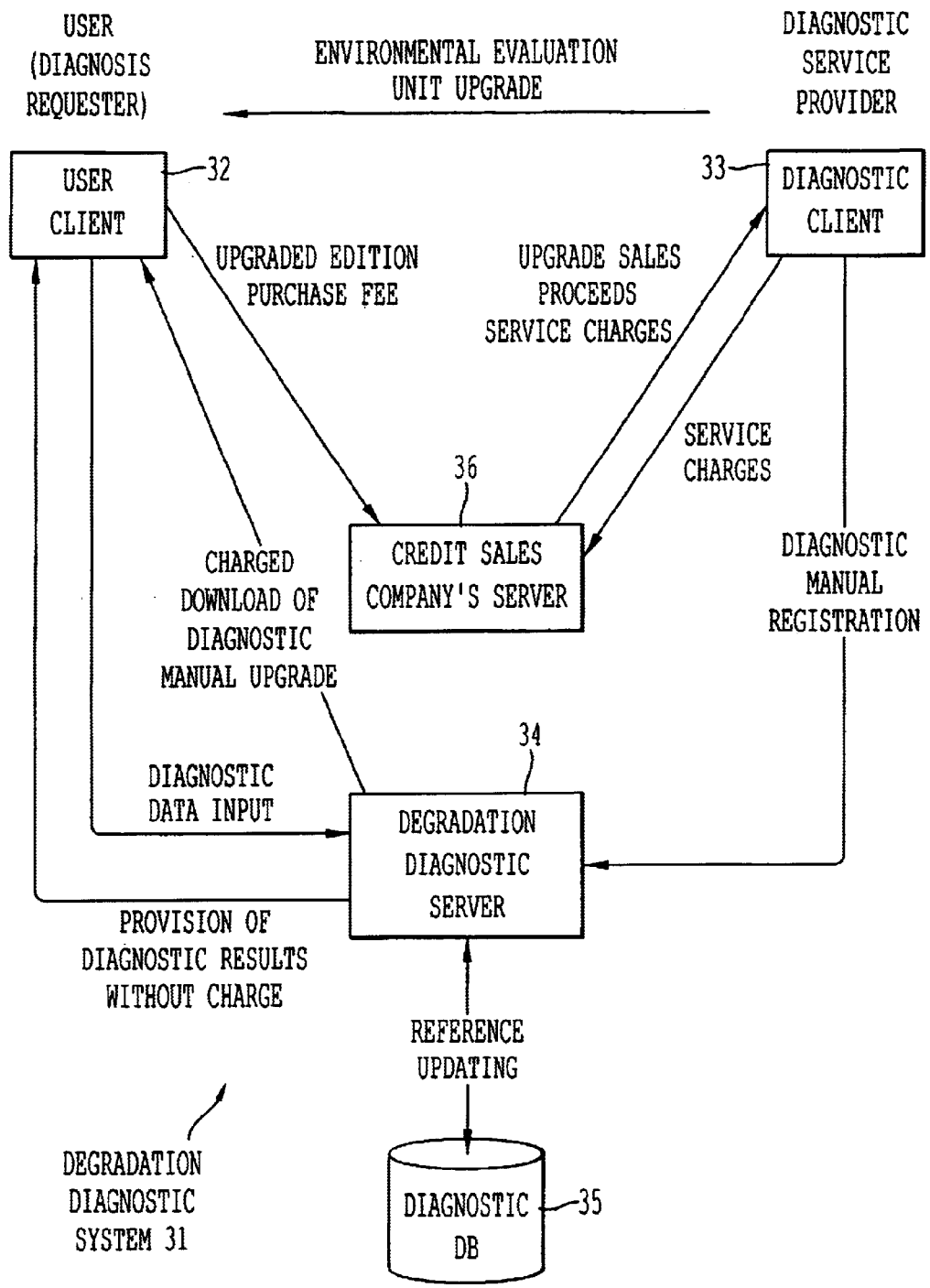
FIG. 22 is a block diagram illustrating a third business method implemented by a degradation diagnostic system.

FIG. 22 is a block diagram illustrating a third business method.

When the diagnostic database 35 managed by degradation diagnostic server 34 is upgraded, accompanying this, the diagnostic service provider also upgrades the environmental evaluation unit and diagnostic manual that have already been supplied to the user.

The diagnostic service provider then collects an upgrade service fee through the credit sales company's server 36.

By executing this third business method, a user can acquire an upgraded environmental evaluation unit and diagnostic manual and can obtain a diagnostic report prepared using the upgraded diagnostic database 35.

Also, the diagnostic service provider can obtain profit by supplying an upgraded environmental evaluation unit and diagnostic manual even if an environmental evaluation unit or diagnostic manual has already been provided to the user.

Figure 23:
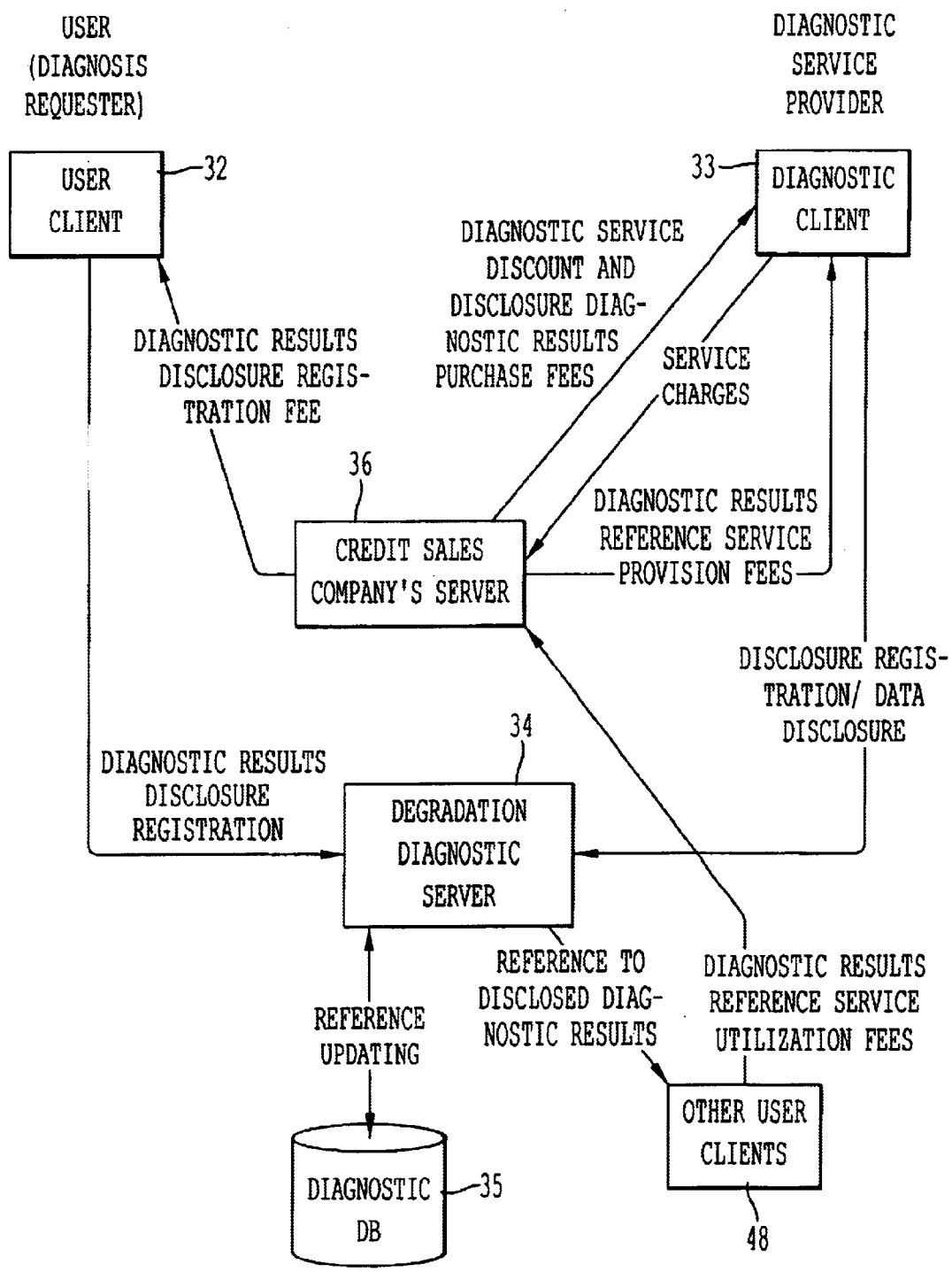
FIG. 23 is a block diagram illustrating a fourth business method implemented by a degradation diagnostic system.

FIG. 23 is a block diagram illustrating a fourth business method.

With this fourth business method, the user registers diagnostic results obtained by utilizing the diagnostic service in the diagnostic database 35 of degradation diagnostic server 34 and so discloses these to other users.

A user who has registered diagnostic results with diagnostic database 35 receives through the credit sales company from the diagnostic service provider disclosure registration fees or diagnostic results purchase fees etc. Or a user who has registered diagnostic results with diagnostic database 35 may receive a discount on the diagnostic service utilization fee.

Other users, by selecting "refer to diagnostic cases", which is one of the items of the diagnostic menu 37, by operating another user client 48, refer to the diagnostic results registered in diagnostic database 35 and pay the fee for referring to these diagnostic results to the diagnostic service provider through the credit sales company.

By executing this fourth business method, a user can sell diagnostic results that the user has itself obtained to other users.

Also, other users can infer the state of degradation of equipment to be diagnosed by referring to previously obtained diagnostic results and so can carry out degradation diagnosis in an efficient manner since, in some cases, this can be done simply by utilizing references to these previous diagnostic cases, without needing to actually execute data collection and/or diagnosis. And other users can easily request degradation diagnosis.

Also, the diagnostic service provider can augment the diagnostic cases introduction service and so eliminate the waste involved in duplicated diagnosis relating to the same or similar conditions.

Figure 24:
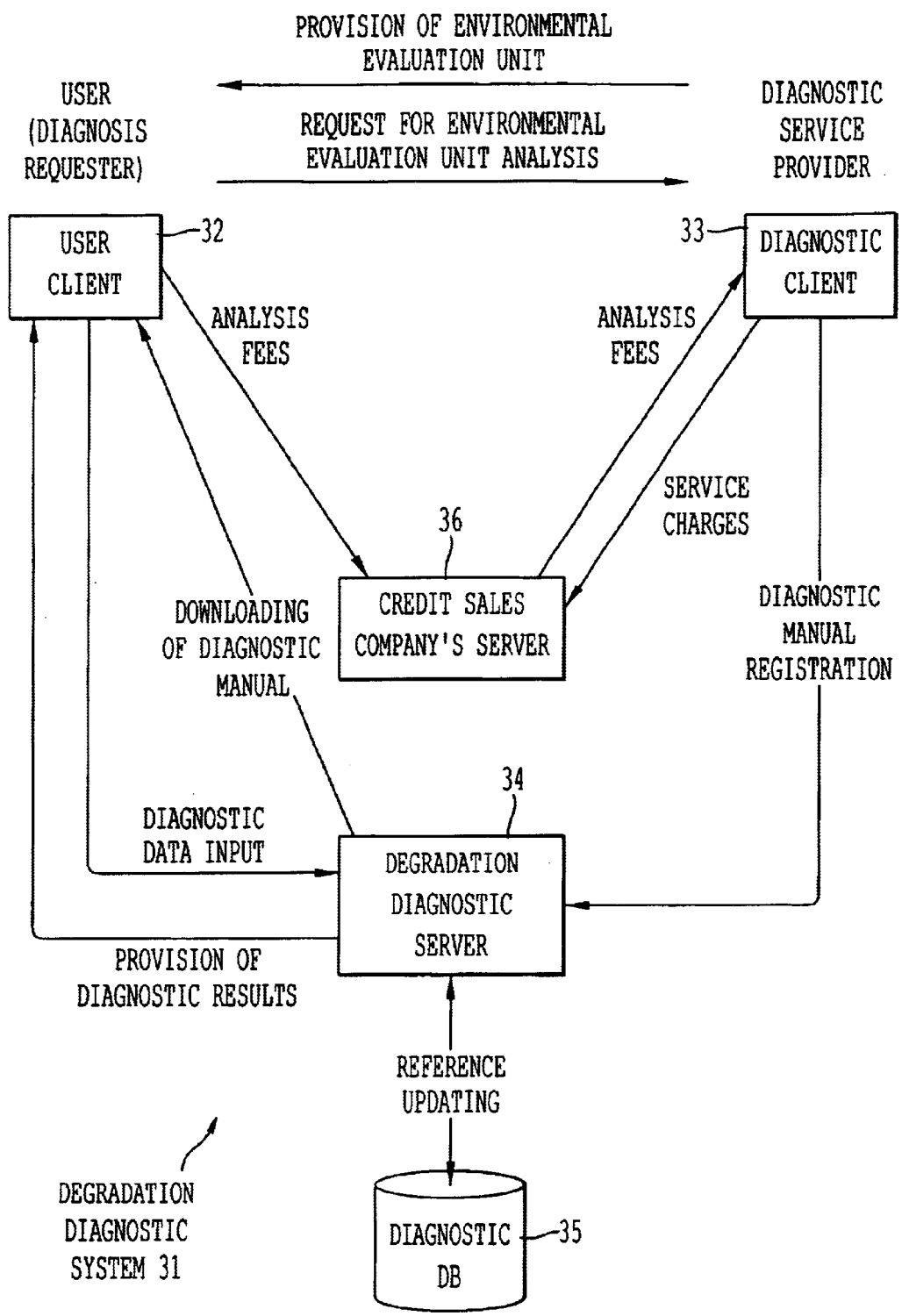
FIG. 24 is a block diagram illustrating a fifth business method implemented by a degradation diagnostic system.

FIG. 24 is a block diagram illustrating a fifth business method.

In this fifth business method, the diagnostic service provider undertakes analysis of the environmental evaluation unit provided to the user and notifies the user of the analysis results. The user pays an analysis fee to the diagnostic service provider through the credit sales company.

By executing this fifth business method, the diagnostic service provider can obtain a profit not merely from the diagnostic service/diagnostic know-how provided by the degradation diagnostic server 34 but also from the analysis of environmental evaluation units.

Figure 25:
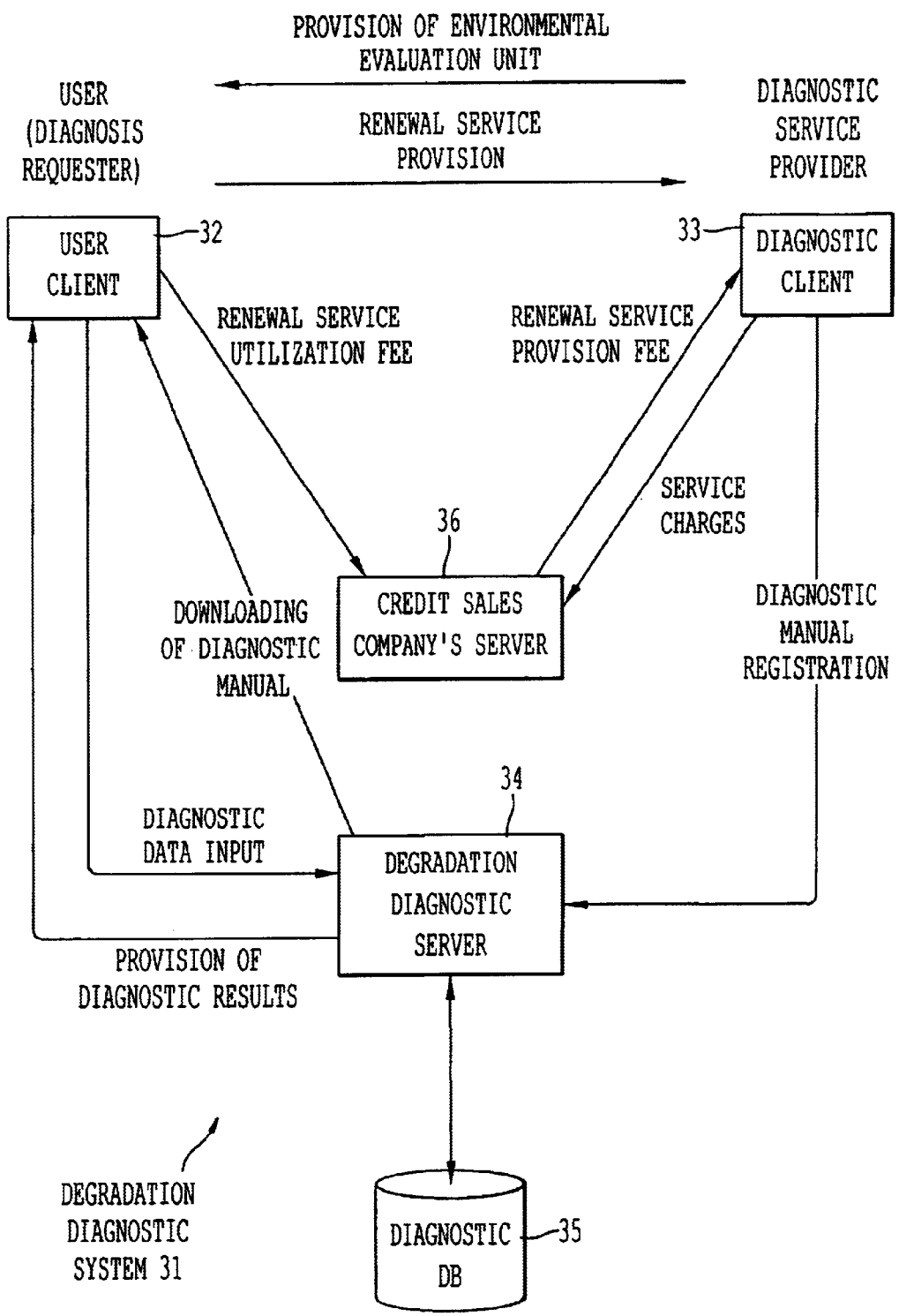
FIG. 25 is a block diagram illustrating a sixth business method implemented by a degradation diagnostic system.

FIG. 25 is a block diagram illustrating a sixth business method.

The diagnostic service provider provides a renewal service (maintenance) comprising component exchange and/or device exchange/device life prolongation measures to the user based on the diagnostic report prepared by the degradation diagnostic server 34. The diagnostic service provider then collects renewal service fees from the users to which the renewal service was provided through the credit sales company.

By executing this sixth business method, the user can acquire an accurate renewal prescription.

Also, the diagnostic service provider can obtain sales resulting from the replacement of components or devices and service fees in respect of renewal services such as washing or coating.

Fourth Embodiment

In this embodiment, a modified example of the method of degradation diagnosis according to the second and third embodiments is described.

Figure 26:
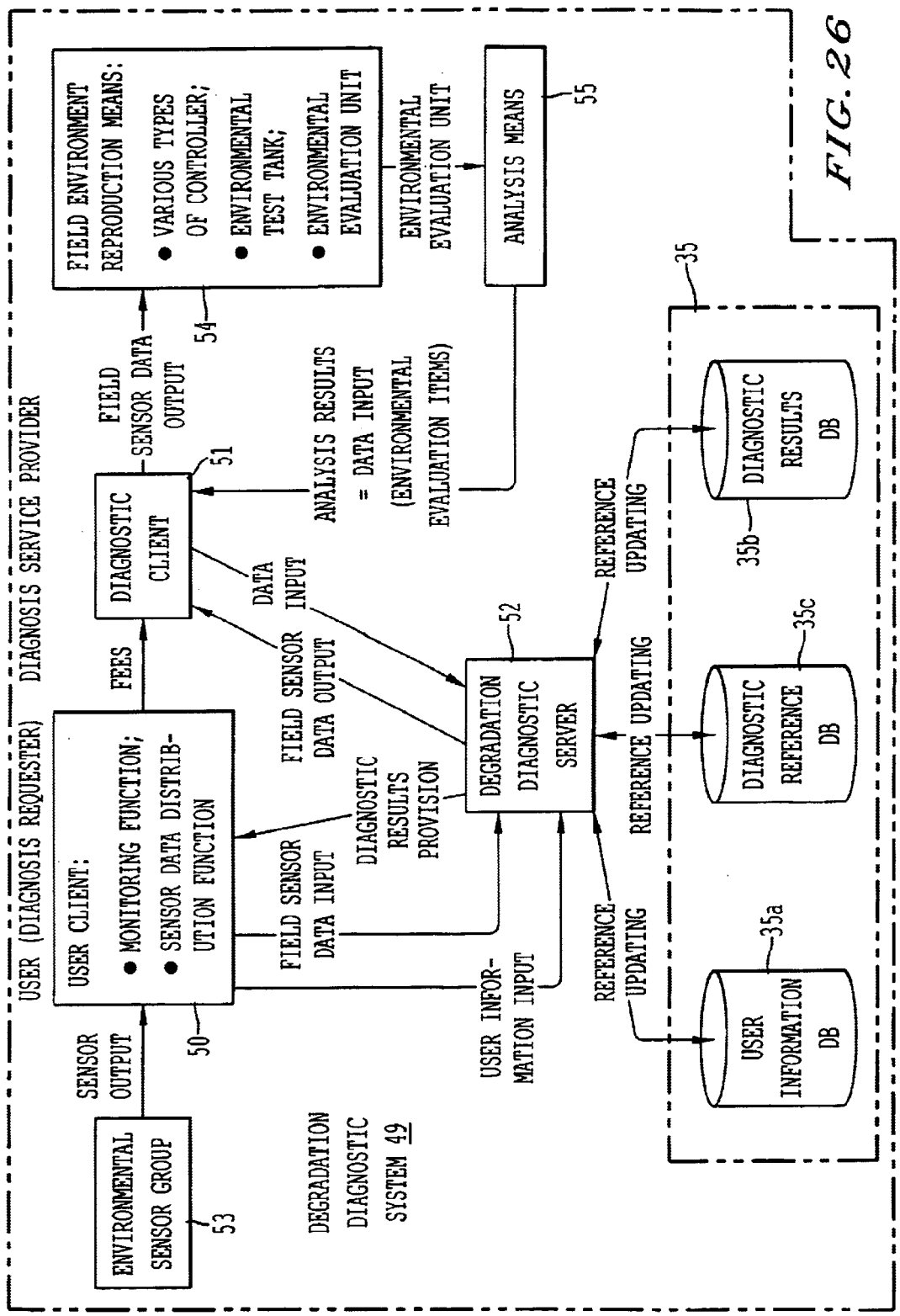
FIG. 26 is a view illustrating the layout of a degradation diagnostic system for implementing a degradation diagnostic method according to a fourth embodiment of the present invention.

FIG. 26 is a view illustrating the layout of a degradation diagnostic system for executing a degradation diagnostic method according to this embodiment.

This degradation diagnostic system 49 is constituted by unifying a user client 50 operated by a user who requests evaluation of the environment in which the equipment is arranged and/or degradation life, a diagnostic client 51 operated by the diagnostic service provider, a degradation diagnostic server 52 that executes degradation diagnostic processing, and a diagnostic database 35 that holds data needed for execution of the diagnosis, by means of an Internet circuit, not shown.

User client 50 is connected with a group of environment sensors 53. User client 50 is equipped with a function of monitoring the atmospheric environment in the vicinity of the equipment by utilizing environmental sensor group 53 and a function of distributing data obtained by such monitoring to degradation diagnostic server 52.

Diagnostic client 51 reads monitoring data of user client 50 from degradation diagnostic server 52 and outputs this to field environment reproduction means (section) 54.

In field environment reproduction means (section) 54 the atmospheric environment conditions in the field where the equipment to be diagnosed is arranged are reproduced at laboratory level by environmental test tanks and various types of controller. Also, an environmental evaluation unit is exposed to this reproduced environment.

The values of the environment evaluation items obtained by environmental testing executed by a diagnostic evaluation unit are input to degradation diagnostic 52 by analysis means (section) 55 and diagnostic client 51.

Degradation diagnostic server 52 infers the environmental evaluation points of the equipment environment and/or the degree of degradation/remaining life of the equipment constituent components/materials by using the input data.

Specifically, degradation diagnostic system 49 according to this embodiment is characterized in that remote diagnosis is implemented by reproducing the installation environment of the equipment to be diagnosed at the diagnostic service provider end; other portions thereof can be identified with the degradation diagnostic system 31 described in the second embodiment.

In the degradation diagnostic mediation server/degradation diagnostic server described in the above embodiments, the arrangement of the various constituents elements can be altered so long as they realize the same action/function and these constituent elements can be freely combined.

Also, the functions of the degradation diagnostic mediation server/degradation diagnostic server described in the above embodiments could be applied to a computer by being written onto a recording medium such as, for example, a magnetic disc (floppy disk or hard disk etc.), optical disc (CD ROM, DVD etc) or semiconductory memory as a program capable of being executed on the computer, or could be applied to a computer by transmission using a communications medium. A computer realizing the above functions executes processing as described above by reading the program recorded on the recording medium, its action being thereby controlled by the program.

In the present invention as described in detail above, a matching degradation diagnostic request handler is selected using the processing execution condition information specified in regard to at least one degradation diagnostic request handler and condition information according to which a diagnosis requester requests degradation diagnosis. Thus, degradation diagnosis is requested and degradation diagnosis is executed satisfying mutual conditions.

Consequently, mediation can be executed between a diagnosis requester and the diagnostic service provider that executes degradation diagnosis; the diagnostic results required by this diagnosis requester can be presented to the diagnosis requester, and diagnosis requesters desiring such diagnostic service providers can be introduced to a wide range of diagnostic service providers.

Also, by publishing the results of executing degradation diagnosis and sharing the results of executing such degradation diagnosis between a plurality of diagnosis requesters, diagnosis results can be provided at an early stage and degradation diagnosis can be provided at low cost; thus requesting and execution of degradation diagnosis can be made more efficient.

That is, by utilizing the present invention, a service can be implemented whereby degradation diagnosis requested by a diagnosis requester from a diagnostic service provider can be executed rapidly and easily at low cost.

Obviously, numerous additional modifications and variations of the present invention are possible in light of the above teachings. It is therefore to be understood that within the scope of the appended claims, the present invention may be practiced otherwise than as specially described herein.

What is claimed is:

1. A degradation diagnostic method, comprising:
   inputting an equipment degradation diagnostic request from a diagnosis requester through a network;
   selecting a degradation diagnosis request handler in accordance with degradation diagnosis execution condition information specified for at least one degradation diagnosis request handler and condition information according to which said diagnosis requester requests degradation diagnosis;
   requesting said selected degradation diagnosis request handler to execute the degradation diagnosis;
   acquiring execution results of the degradation diagnosis by said selected degradation diagnostic request handler; and
   outputting the execution results through said network to said diagnosis requester;
   wherein, if environmental information utilized in the degradation diagnosis by said selected degradation diagnosis request handler is deficient, a measurement request handler of said deficient environmental information is selected and is requested to measure said deficient environmental information, and results of measurement of said deficient environmental information are provided to said selected degradation diagnosis request handler.

2. A degradation diagnostic method, comprising:
   registering in a diagnostic results database contents of an equipment degradation diagnostic request and execution results of a degradation diagnosis in accordance with said equipment degradation diagnostic request;
   first inputting a degradation diagnostic request from a diagnosis requester through a network;
   reading the execution results of the degradation diagnosis in accordance with a degradation diagnostic request having a prescribed relationship from said diagnostic results database if said degradation diagnostic request having a prescribed relationship with said degradation diagnostic request input from a diagnosis requester is registered in said diagnostic results database; and
   outputting the execution results of the degradation diagnosis to said diagnosis requester through said network.

3. The degradation diagnostic method according to claim 1, further comprising:
   registering said execution results and contents of said degradation diagnostic request that was a cause of said execution results in a diagnostic results database;
   inputting another degradation diagnostic request from another diagnosis requester through said network;
   reading said execution results of the degradation diagnosis in accordance with a degradation diagnostic request having a prescribed relationship from said diagnostic results database if the degradation diagnostic request having the prescribed relationship with said degradation diagnostic request input from the another diagnosis requester is registered in said diagnostic results database; and
   outputting said execution results to said another diagnosis requester through said network.

4. The degradation diagnosis method according to any one of claims 1 to 3, further comprising:
   inputting an equipment maintenance request from the diagnosis requester that obtained said execution results through said network; and
   requesting a maintenance by selecting a maintenance request handler.

5. A degradation diagnosis method comprising:
   storing information for diagnostic purposes specifying degradation diagnostic processing whereby a state of degradation of equipment is diagnosed in a diagnostic database;
   inputting said information utilized in said degradation diagnostic processing from a diagnosis requester through a network;
   executing said degradation diagnostic processing in accordance with said information for diagnostic purposes stored in said diagnostic database and information input from said diagnosis requester to obtain execution results; and
   outputting said execution results to said diagnosis requester through said networks,
   wherein, if environmental information utilized in the degradation diagnosis is deficient, said deficient environmental information is measured, and results of measurement of said deficient environmental information are provided for said selected degradation diagnosis.

6. A degradation diagnosis method, comprising:
   storing information for diagnostic purposes that specifies degradation diagnostic processing whereby a state of degradation of equipment is diagnosed and manual information relating to said degradation diagnostic processing in a diagnostic database;
   designating sending out of an environmental evaluation unit if a request for sending out of said environmental evaluation unit to be utilized in measurement for evaluation of an environment is input from a diagnosis requester through a network;
   outputting said manual information stored in said diagnostic database to said diagnosis requester through the network if a request for output of said manual information is input through said network from said diagnosis requester;

inputting information utilized in said execution diagnostic processing from said diagnosis requester through said network;

executing said degradation diagnostic processing in accordance with the information for diagnostic purposes stored in said diagnostic database and said information input from said diagnosis requester and obtaining execution results; and outputting said execution results to said diagnosis requester through said network.

7. A method of degradation diagnosis according to claim 6, further comprising:

when said environmental evaluation unit is updated, inputting new manual information involved in said updating; and storing said new manual information in said diagnostic database.

8. A method of degradation diagnosis according to claim 6 or 7, further comprising:

storing new information for diagnostic purposes that specifies said updated degradation diagnostic processing in said diagnostic database when said degradation diagnostic processing is updated.

9. A method of degradation diagnosis according to any one of claims 5 to 7, further comprising:

inputting information utilized in said degradation diagnostic processing from a new diagnosis requester through said network; and reading said execution results of the degradation diagnostic processing in accordance with information having a prescribed relationship from said diagnostic results database if information having the prescribed relationship with the information input from said new diagnosis requester is registered in said diagnostic database; and outputting the execution results to said new diagnosis requester through said network.

10. A method of degradation diagnosis according to any one of claims 5 to 7, further comprising:

managing service charges relating to the degradation diagnosis requested by said diagnosis requester.

11. A degradation diagnosis mediation device, comprising:

a selection section configured to input an equipment degradation diagnostic request from a diagnosis requester through a network and to select a degradation diagnosis request handler in accordance with degradation diagnosis execution condition information specified for at least one degradation diagnosis request handler and condition information according to which said diagnosis requester requests a degradation diagnosis, and to request said selected degradation diagnosis request handler to execute the degradation diagnosis; and a result output section configured to acquire execution results of the degradation diagnosis by said selected degradation diagnosis request handler and to output said execution results through said network to said diagnosis requester, wherein, if environmental information utilized in the degradation diagnosis by said selected degradation diagnosis request handler is deficient, a measurement request handler of said deficient environmental information is selected and is requested to measure said deficient environmental information, and results of measurement of said deficient environmental information are provided to said selected degradation diagnosis request handler.

12. A degradation diagnosis mediation device, comprising:

a diagnostic results database in which is registered a content of an equipment degradation diagnostic request and execution results of a degradation diagnosis in accordance with a degradation diagnostic request;

a reusable results output section configured to output the degradation diagnostic request from a diagnostic requester through a network and, if a degradation diagnostic request having a prescribed relationship with said degradation diagnostic request input from said diagnosis requester is registered in said diagnostic results database, to read said execution results of a the degradation diagnosis in accordance with said degradation diagnostic request having the prescribed relationship from said diagnostic results database and to output said execution results to said diagnosis requester through said network.

13. The degradation mediation device according to claim 11, further comprising:

a results registration section configured to acquire the execution results of the degradation diagnosis obtained by said selected degradation diagnostic request handler and to register said execution results and a content of said degradation diagnostic request that was an execution cause in a diagnostic results database; and a reusable results output section configured to newly input another degradation diagnostic request from another diagnosis requester through said network and, if a degradation diagnostic request having a prescribed relationship with said another degradation diagnostic request input from the another diagnosis requester is registered in said diagnostic results database, to read said execution results of the another degradation diagnosis in accordance with said another degradation diagnostic request having said prescribed relationship from said diagnostic results database and to output said execution results to said another diagnosis requester through said network.

14. The degradation mediation device according to any one of claims 11 to 13, further comprising:

a maintenance request selection section configured to input an equipment maintenance request from a diagnosis requester that obtained said execution results through said network and to request maintenance by selecting a maintenance request handler.

15. A degradation diagnostic device, comprising:

a diagnostic section configured to input information utilized in degradation diagnostic processing whereby a state of degradation of equipment is diagnosed from a diagnosis requester through a network, to access a diagnostic database that stores information for diagnostic purposes that specifies said degradation diagnostic processing, to execute said degradation diagnostic processing in accordance with said information for diagnostic purposes stored in said diagnostic database and information input from said diagnosis requester to obtain execution results, and to output said execution results to said diagnosis requester through said network, wherein, if environmental information utilized in the degradation diagnosis is deficient, said deficient environmental information is measured, and results of measurement of said deficient environmental information are provided for said selected degradation diagnosis.

16. The degradation diagnostic device according to claim 5, further comprising:
an output section configured to input a request for reading manual information relating to degradation diagnostic processing from a diagnosis requester through said network and to output said manual information through said network to said diagnosis requester that requested a reading.

17. The degradation diagnostic device according to claim 15 or 16, further comprising:
a sending section configured to input a request for sending out an environmental evaluation unit utilized for measurement for evaluation of an environment state in which an equipment is arranged from the diagnosis requester through said network and to give instructions for sending out of said environmental evaluation unit.

18. The degradation diagnostic device according to claim 15 or 16, further comprising:
a storage section configured to store in said diagnostic database execution results obtained by said diagnostic requester; and
a storage management section configured to input information utilized for said degradation diagnostic processing from another diagnosis requester through said network and, if information having a prescribed relationship with said information input from said another diagnosis requester is registered in said diagnostic database, to read from said diagnostic database execution results of said degradation diagnostic processing based on the information having the prescribed relationship and to output said execution results to said another diagnosis requester through said network.

19. The degradation diagnostic device according to claim 15 or 16, further comprising:
a requester information management section configured to manage information of diagnosis requesters; and
a fee management section configured to manage service fees resulting from requests relating to the degradation diagnosis input through said network from said diagnosis requester utilizing the information of said requester information management section.

20. A computer-readable recording medium on which is recorded a program for implementing on a computer, said program comprising:
a selection function configured to input an equipment degradation diagnosis request from a diagnosis requester through a network, to select a degradation diagnosis request handler based on execution condition information of a prescribed degradation diagnosis concerning at least one degradation diagnosis request handler and condition information according to which said diagnosis requester requests the degradation diagnosis, and to request execution of the degradation diagnosis by said selected degradation diagnosis requests handler; and
a results output function configured to acquire execution results of the degradation diagnosis obtained by said selected degradation diagnosis requests handler and to output said execution results to said diagnosis requester through the network.

21. A computer-readable recording medium on which is recorded a program for implementing on a computer, said program comprising:
a results registration function configured to register a content of an equipment degradation diagnosis request and execution results of a degradation diagnosis in accordance with said equipment degradation diagnosis request in a diagnostic results database; and
a reusable results output function configured to input a degradation diagnostic request from a diagnostic requester through a network and, if a degradation diagnostic request having a prescribed relationship with the degradation diagnostic request input from said diagnosis requester is registered in said diagnostic results database, to read said execution results of a the degradation diagnosis in accordance with said degradation diagnostic request having the prescribed relationship from said diagnostic results database and to output said execution results to said diagnosis requester through said network.

22. The computer-readable recording medium according to claim 20, said program further comprising:
a results registration function configured to acquire the execution results of degradation diagnosis executed by said selected degradation diagnosis request handler and to register the execution results and a content of said degradation diagnostic request that was an execution cause in a diagnostic results database; and
a reusable results output function configured to input another degradation diagnostic request from another diagnostic requester through the network and, if a degradation diagnostic request having a prescribed relationship with said degradation diagnostic request input from the another diagnosis requester is registered in said diagnostic results database, to read the execution results of the degradation diagnosis in accordance with the degradation diagnostic request having a prescribed relationship from said diagnostic results database and to output said execution results to said another diagnosis requester through said network.

23. A computer-readable recording medium on which is recorded a program for implementing on a computer, said program comprising:
a diagnostic function configured to input information utilized for degradation diagnostic processing whereby a state of degradation of equipment is diagnosed is input from a diagnosis requester through a network, to access a diagnostic database in which is stored information for diagnostic purposes that specifies said degradation diagnostic processing, to form said degradation diagnostic processing in accordance with information for diagnostic purposes stored in said diagnostic database and information input from said diagnosis requester, and to output said execution results to said diagnosis requester through said network,
wherein, if environmental information utilized in the degradation diagnosis is deficient, said deficient environmental information is measured, and results of measurement of said deficient environmental information are provided for said selected degradation diagnosis.

24. The computer-readable recording medium according to claim 23, said program further comprising:
a storage function configured to store in said diagnostic database the execution results obtained by said diagnostic function and information input from said diagnosis requester; and
a storage management function configured to input information utilized for said degradation diagnostic processing from another diagnosis requester through said network and, if information having a prescribed relationship with information input from another diagnosis requester is registered in said diagnostic database, to read results of said degradation diagnostic processing in accordance with the information having said prescribed relationship from said diagnostic database and to output the results to said new diagnosis requester through said network.

25. A degradation diagnostic method, comprising:

inputting an equipment degradation diagnostic request from a diagnosis requester through a network;

selecting a degradation diagnosis request handler in accordance with degradation diagnosis execution condition information specified for at least one degradation diagnosis request handler and condition information according to which said diagnosis requester requests degradation diagnosis;

requesting said selected degradation diagnosis request handler to execute degradation diagnosis;

acquiring execution results of the degradation diagnosis by said selected degradation diagnostic request handler;

outputting the execution results through said network to said diagnosis requester;

registering said execution results and contents of said degradation diagnostic request that was a cause of said execution results in a diagnostic results database;

second inputting another degradation diagnostic request from another diagnosis requester through said network;

reading said execution results of the degradation diagnosis in accordance with a degradation diagnostic request having a prescribed relationship from said diagnostic results database if the degradation diagnostic request having the prescribed relationship with said degradation diagnostic request input from the another diagnosis requester is registered in said diagnostic results database; and outputting said execution results to said another diagnosis requester through said network.

26. A degradation diagnosis mediation device, comprising:

a selection section configured to input an equipment degradation diagnostic request from a diagnosis requester through a network and to select a degradation diagnosis request handler in accordance with degradation diagnosis execution condition information specified for at least one degradation diagnosis request handler and condition information according to which said diagnosis requester requests a degradation diagnosis, and to request said selected degradation diagnosis request handler to execute the degradation diagnosis;

a result output section configured to acquire execution results of the degradation diagnosis by said selected degradation diagnostic request handler and to output said execution results through said network to said diagnosis requester;

a results registration section configured to acquire execution results of the degradation diagnosis obtained by said selected degradation diagnostic request handler and to register said execution results and a content of said degradation diagnostic request that was an execution cause in a diagnostic results database; and a reusable results output section configured to newly input another degradation diagnostic request from another diagnosis requester through said network and, if a degradation diagnostic request having a prescribed relationship with said another degradation diagnostic request input from the another diagnosis requester is registered in said diagnostic results database, to read said execution results of the another degradation diagnosis in accordance with said another degradation diagnostic request having said prescribed relationship from said diagnostic results database and to output said execution results to said another diagnosis requester through said network.

27. A computer-readable recording medium on which is recorded a program for implementing on a computer, said program comprising:

a diagnostic function configured to input information utilized for degradation diagnostic processing whereby a state of degradation of equipment is diagnosed from a diagnosis requester through a network, to access a diagnostic database in which is stored information for diagnostic purposes that specifies said degradation diagnostic processing, that forms said degradation diagnostic processing in accordance with information for diagnostic purposes stored in said diagnostic database and information input from said diagnosis requester, and to output said execution results to said diagnosis requester through said network; and a storage management function configured to input information utilized for said degradation diagnostic processing from another diagnosis requester through said network and, if information having a prescribed relationship with information input from another diagnosis requester is registered in said diagnostic database, to read results of said degradation diagnostic processing in accordance with the information having said prescribed relationship from said diagnostic database and to output the results to said new diagnosis requester through said network.

* * * * *